United States Patent
Marvasti et al.

(10) Patent No.: US 9,996,444 B2
(45) Date of Patent: Jun. 12, 2018

(54) AUTOMATED METHODS AND SYSTEMS FOR CALCULATING HARD THRESHOLDS

(71) Applicant: VMware, Inc., Palo Alto, CA (US)

(72) Inventors: Mazda A. Marvasti, Coto de Caza, CA (US); Ashot Nshan Harutyunyan, Yerevan (AM); Naira Movses Grigoryan, Yerevan (AM); Arnak Poghosyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 809 days.

(21) Appl. No.: 14/314,490

(22) Filed: Jun. 25, 2014

(65) Prior Publication Data

US 2015/0379110 A1    Dec. 31, 2015

(51) Int. Cl.
| | |
|---|---|
| G06F 17/30 | (2006.01) |
| G06F 11/34 | (2006.01) |
| G06F 11/07 | (2006.01) |
| G05B 23/02 | (2006.01) |

(52) U.S. Cl.
CPC ...... *G06F 11/3452* (2013.01); *G05B 23/0227* (2013.01); *G06F 11/0706* (2013.01); *G06F 11/0754* (2013.01); *G06F 11/3409* (2013.01); *G06F 2201/81* (2013.01)

(58) Field of Classification Search
CPC ............. G05B 23/0221; G05B 23/024; G05B 23/0227; G05B 23/0235; G06F 11/3452; G06F 11/0754; G06F 2201/81; G06F 17/18; H04L 41/142; H04L 43/04
See application file for complete search history.

(56) References Cited

U.S. PATENT DOCUMENTS

| | | | | |
|---|---|---|---|---|
| 7,031,884 B1* | 4/2006 | Radulovic | ............... | H04L 43/00 702/189 |
| 8,171,033 B2* | 5/2012 | Marvasti | ................ | G06F 17/18 702/160 |
| 2003/0061152 A1* | 3/2003 | De | ....................... | G06Q 40/025 705/38 |
| 2003/0233197 A1* | 12/2003 | Padilla | ................... | G06F 19/20 702/20 |
| 2009/0043822 A1* | 2/2009 | Sarkar | ................... | G06F 3/0605 |
| 2010/0036643 A1* | 2/2010 | Marvasti | ........... | G06F 17/30548 702/189 |
| 2010/0036857 A1* | 2/2010 | Marvasti | .............. | G06K 9/0053 707/725 |
| 2010/0332411 A1* | 12/2010 | Rachev | .................. | G06Q 40/00 705/36 R |

(Continued)

*Primary Examiner* — Kris Mackes
*Assistant Examiner* — Merilyn Nguyen
(74) *Attorney, Agent, or Firm* — Clayton, McKay & Bailey, PC

(57) ABSTRACT

This disclosure is directed to automated methods and systems for calculating hard thresholds used to monitor time-series data generated by data-generating entity. The methods are based on determining a cumulative distribution that characterizes the probability that data values of time-series data generated by the data-generating entity violate a hard threshold. The hard threshold is calculated as an inverse of the cumulative distribution based on a user defined risk confidence level. The hard threshold may then be used to generate alerts when time-series data generated later by the data-generating entity violate the hard threshold.

21 Claims, 19 Drawing Sheets

(56) References Cited

U.S. PATENT DOCUMENTS

| | | | |
|---|---|---|---|
| 2011/0119029 A1* | 5/2011 | Marvasti | G05B 23/0221 |
| | | | 702/179 |
| 2013/0041644 A1* | 2/2013 | Cremonesi | G06Q 10/06 |
| | | | 703/13 |
| 2013/0041710 A1* | 2/2013 | Civil | G06F 17/18 |
| | | | 705/7.27 |
| 2014/0032506 A1* | 1/2014 | Hoey | G06F 17/30303 |
| | | | 707/691 |
| 2014/0200953 A1* | 7/2014 | Mun | G06Q 10/04 |
| | | | 705/7.28 |
| 2014/0266714 A1* | 9/2014 | Becker Antley | G06Q 10/107 |
| | | | 340/540 |
| 2014/0298098 A1* | 10/2014 | Poghosyan | G06F 11/3452 |
| | | | 714/37 |
| 2015/0356243 A1* | 12/2015 | Andreassen | G06F 19/18 |
| | | | 702/20 |

* cited by examiner

| Quantile | $\gamma$ | $\sigma$ | Relative Error |
|---|---|---|---|
| 0.9 | -0.1661 | $2.23 \times 10^7$ | 0.16 |
| 0.91 | -0.1208 | $2.55 \times 10^7$ | 0.12 |
| 0.92 | -0.0588 | $2.97 \times 10^7$ | 0.082 |
| 0.93 | $-7.8 \times 10^{-5}$ | $3.38 \times 10^7$ | 0.063 |
| 0.94 | -0.0002 | $3.37 \times 10^7$ | 0.074 |
| 0.95 | 0.0193 | $3.50 \times 10^7$ | 0.069 |
| 0.96 | 0.1111 | $4.09 \times 10^7$ | 0.049 |
| 0.97 | 0.15131 | $4.19 \times 10^7$ | 0.057 |
| 0.98 | 0.1063 | $3.70 \times 10^7$ | 0.085 |
| 0.99 | -0.0765 | $2.55 \times 10^7$ | 0.13 |

FIG. 16

AUTOMATED METHODS AND SYSTEMS FOR CALCULATING HARD THRESHOLDS

TECHNICAL FIELD

The present disclosure is directed to automated management tools of data-generating entities, and in particular, to automated methods and system for calculating hard thresholds used to monitor data generated by data-generating entities.

BACKGROUND

With the advent of increased computing power and data storage, the development of computational tools to study ever increasingly complex systems in detail has increased. Examples of complex systems include weather systems, ecosystems, biological systems, business operations, information technology, and cloud computing systems just to name a few. Of particular importance to those who study these complex systems is the ability to identify variations, such as abnormalities, that occur within these complex systems. For example, in the case of a data center, variations from normal or expected computational operations could lead to failures, slowdown, and other problems. These types of problems are often triggered by unobserved variations or abnormalities in the operation of processes or computational resources that may cascade into larger problems.

Monitoring complex systems generates vast amounts of time-series data that is collected, analyzed, and presented for human understanding. In recent years, computational techniques have been developed to detect anomalies in time-series data that does not conform to an established normal behavior for a complex system. These anomalies may translate into critical and actionable information in several application domains. In particular, thresholds are typically used to identify anomalies in flows of time-series data. Alerts are generated when the time-series data violates a predefined threshold. Many processes used to monitor complex systems provide hard threshold features and dynamic threshold capabilities with the hard thresholds set manually. However, with the increasing volume and variety of time-series data collected for complex systems, manually setting hard thresholds to monitor the behavior of complex systems is often infeasible.

SUMMARY

This disclosure is directed to automated methods and systems for calculating hard thresholds used to monitor time-series data generated by data-generating entity. The methods and systems are data-agnostic in that the data-generating entity can be a computational process, computer, sensor, virtual or physical machine running in a data center or other computational environment, or a computational resource, such as a processor, memory or network connection. The methods are based on determining a cumulative distribution that characterizes the probability that data values of time-series data generated by the data-generating entity violate a hard threshold. The hard threshold is calculated as an inverse of the cumulative distribution based on a user defined risk confidence level. The hard threshold may then be used to generate alerts when time-series data generated later by the data-generating entity violate the hard threshold.

DESCRIPTION OF THE DRAWINGS

FIG. 16 shows a table of results for a parametric implementation method applied to the data shown in FIG. 15.

DETAILED DESCRIPTION

This disclosure is directed to automated, data-agnostic computational methods and systems for calculating hard thresholds used to monitor time-series data generated by a data-generating entity. The data-generating entity can be a computational process, computer, sensor, virtual or physical machine running in a data center or other computational environment, or a computational resource, such as a processor, memory or network connection. The time-series data may be metric data that represents usage of the data-generating entity over time. For example, the data-generating entity can be a processor and the time-series data can be percentage of processor usage measured over time.

It should be noted, at the onset, that the currently disclosed computational methods and systems are directed to real, tangible, physical systems and the methods carried out within physical systems, including client computers and server computers. Those familiar with modern science and technology well appreciate that, in modern computer systems and other processor-controlled devices and systems, the control components are often fully or partially implemented as sequences of computer instructions that are stored in one or more electronic memories and, in many cases, also in one or more mass-storage devices, and which are executed by one or more processors. As a result of their execution, a processor-controlled device or system carries out various operations, generally at many different levels within the device or system, according to control logic implemented in the stored and executed computer instructions. Computer-instruction-implemented control components of modern processor-controlled devices and systems are as tangible and physical as any other component of the system, including power supplies, cooling fans, electronic memories and processors, and other such physical components.

Figure 1:
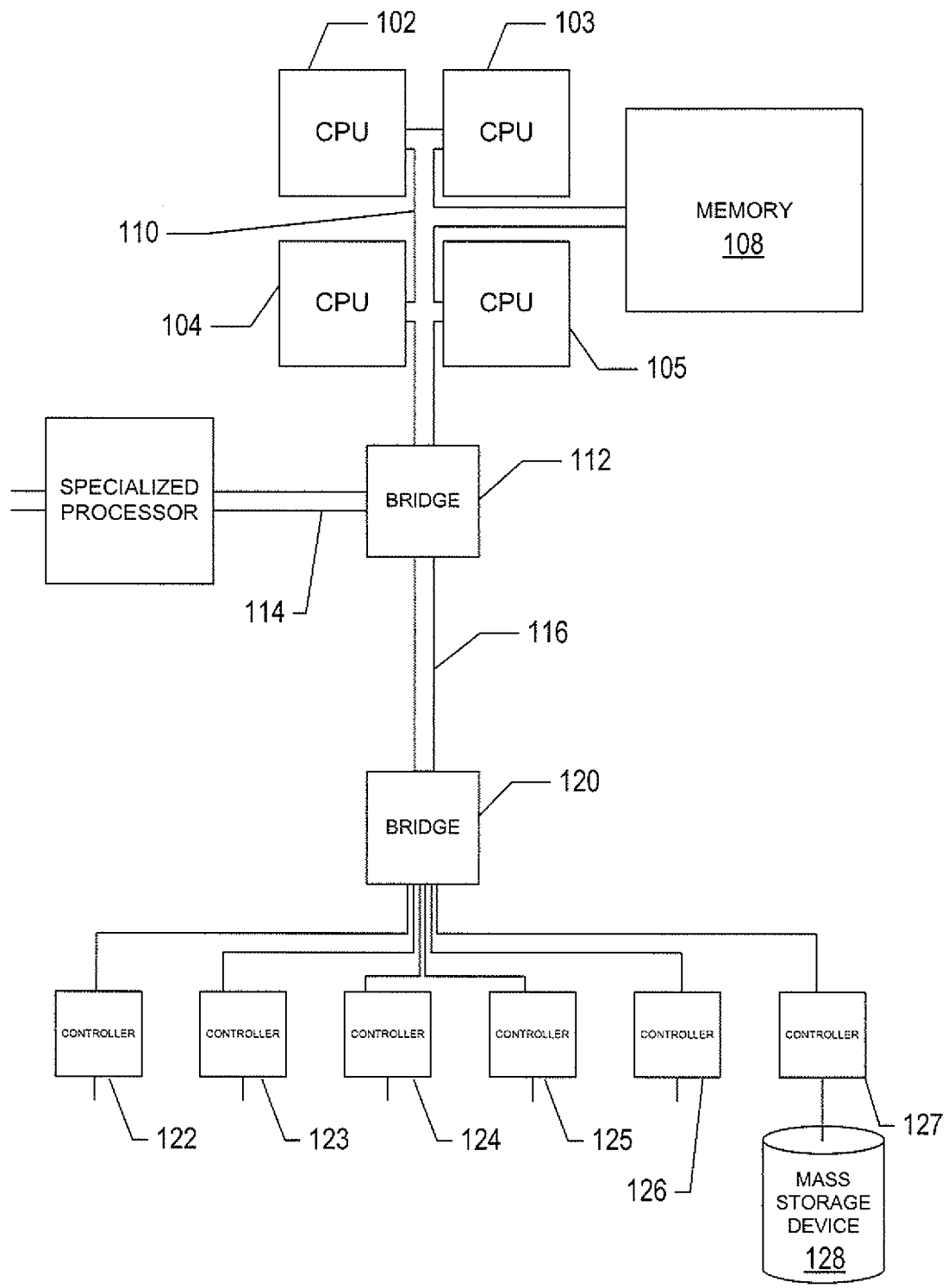
FIG. 1 provides a general architectural diagram for various types of computers.

FIG. 1 provides a general architectural diagram for various types of computers. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. The busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of computer-readable media, such as computer-readable medium 128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 128 is a data-storage device, including electronic memory, optical or magnetic disk drive, USB drive, flash memory and other such data-storage devices. The computer-readable medium 128 can be used to store machine-readable instructions that encode the computational methods described below and can be used to store encoded data, during store operations, and from which encoded data can be retrieved, during read operations, by computer systems, data-storage systems, and peripheral devices.

Time-Series Data

Time-series data associated with a data-generating entity is represented by $$X_k = X(t_k) \quad (1)$$

where $X_k$ represents a discrete data point or value;
$t_k$ represents a time stamp; and
subscript k is a data point index.
The time-series data can be collected and stored in computer-readable medium. A set of N consecutive time-series data points $X_k$ are represented in set notation by $$\overline{X} = \{X_k\}_{k=1}^{N} \quad (2)$$

The set of data $\overline{X}$ may have a tendency to follow a particular shape or pattern and is categorized as "trendy." Alternatively, the set of data $\overline{X}$ may be randomly distributed and categorized as "non-trendy." For example, trendy time-series data may increases or decreases over time while non-trendy time-series data stochastically varies over time.

Data points in the set of data $\overline{X}$ may be decomposed into trendy and non-trendy components as follows:

$$X(t_k) = x(t_k) + \text{trend}(t_k) \quad (3)$$

where $x(t_k)$ represents the stochastic (i.e., random) component of the data point $X(t_k)$; and
$\text{trend}(t_k)$ is the trend component of the data point $X(t_k)$.
When the set of data $\overline{X}$ is non-trendy, the trend component is essentially zero $\text{trend}(t_k) \approx 0$ and the data point representation in Equation (3) reduces to $$X(t_k) = x(t_k) \quad (4)$$

On the other hand, when the set of data $\overline{X}$ is trendy, the trend component in Equation (3) is not equal to zero (i.e., $\text{trend}(t_k) \neq 0$) and the data point representation in Equation (3) holds.

Figure 2:
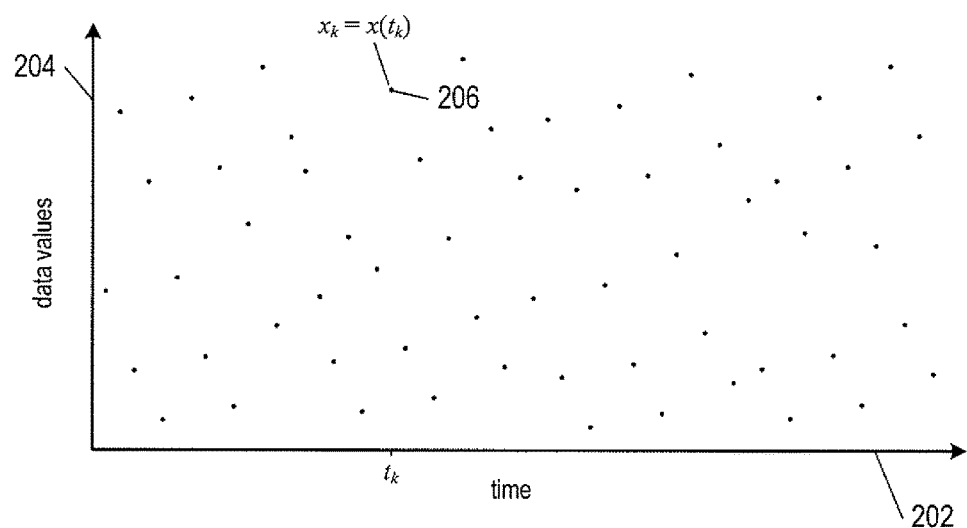
FIG. 2 shows an example plot of non-trendy time-series data.
Figure 3:
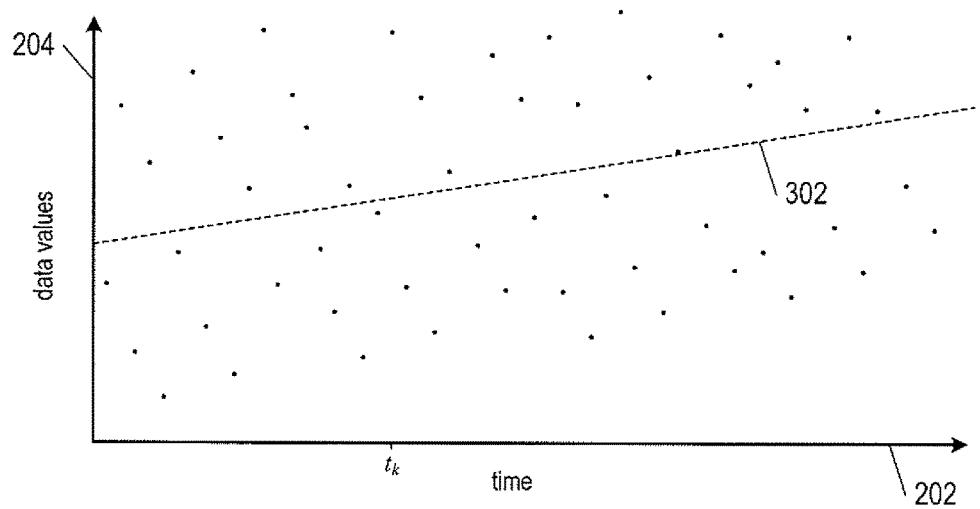
FIG. 3 shows an example plot of trendy time-series data.

FIG. 2 shows an example plot of non-trendy time-series data, and FIG. 3 shows an example plot of trendy time-series data. In FIGS. 2-3, horizontal axes 202 represents time, vertical axes 204 represents data values, and dots, such as dot 206, represent data points $X_k$ of non-trendy and trendy data, respectively. In the example of FIG. 2, the data points are randomly distributed and do not exhibit a trend. By contrast, in the example of FIG. 3, the data points exhibit a trend in which the values of the data points increase with time as indicated by dashed line 302.

Trend Detection and Trend Removal in Time-Series Data

In order to apply analysis of extremes methods described below applied to calculate a hard threshold for the set of data $\overline{X}$, the set of data $\overline{X}$ is first categorized as either trendy or non-trendy. If the set of data $\overline{X}$ is categorized as trendy, then the trend components are identified and essentially removed to obtain non-trendy, time series data.

Trend detection is applied to the set of data $\overline{X}$ in order to categorize the data as either trendy or non-trendy data. A trend in the set of data $\overline{X}$ may be determined by calculating a trend measure give by:

$$p = \left| \frac{S_0}{S_{max}} \right| 100\% \quad (5)$$

where the numerator $S_0$ is a sum of sign differences for the full set of data set $\overline{X}$ given by $$S_0 = \sum_{k=1}^{N-1} \sum_{j=k+1}^{N} \text{sign}(X_j - X_k) \quad (6a)$$

with $$\text{sign}(X_j - X_k) = \begin{cases} -1 & \text{when } (X_j - X_k) < 0 \\ 0 & \text{when } (X_j - X_k) = 0 \\ +1 & \text{when } (X_j - X_k) > 0 \end{cases}$$

and the denominator $S_{max}$ is a count of the number of difference combinations given by $$S_{max} = \sum_{k=1}^{N-1} \sum_{j=k+1}^{N} 1 \qquad (6b)$$

The sign of the numerator $S_0$ determines whether the set of data $\overline{X}$ is increasing or decreasing. When $S_0>0$ the set of data $\overline{X}$ is increasing, and when $S_0<0$ the set of data $\overline{X}$ is decreasing. When the trend measure p is greater than a trend threshold $T_{trend}$ (e.g., $T_{trend}=60\%$), the set of data $\overline{X}$ follows a trend and is categorized as trendy as represented by Equation (3). Otherwise, when the trend measure p is less than the percentage threshold $T_{trend}$, the set of data $\overline{X}$ does not follow a trend over time and is categorized as non-trendy as represented by Equation (4).

When the set of data $\overline{X}$ is categorized as non-trendy, analysis of extremes described below is used to calculate a hard threshold. On the other hand, when the set of data $\overline{X}$ is categorized as trendy, trend recognition is used to further categorize the trendy data as linear, log-linear, or non-linear trendy data.

Suppose the set of data $\overline{X}$ has been categorized as trendy. Trend recognition may first be applied to determine whether or not the trend in the set of data $\overline{X}$ is linear. This may be accomplished by applying linear regression analysis to the set of data $\overline{X}$ in order to calculate a regression line that represents the relationship between $X_k$ and $t_k$. The set of data $\overline{X}$ is checked for goodness-of-fit with resulting regression line according to $$R = 1 - \frac{R_{regression}}{R_0} \qquad (7)$$

where $R_{regression}$ is a sum of squares of vertical distances of the data points $X(t_k)$ from the regression line; and $R_0$ is a sum of squares of vertical distances of the data points $X(t_k)$ from a line with zero slop and passing through the mean value of the data point.

The goodness-of-fit R is a unitless fraction between 0 and 1. When R equals 1 all data points in the set of data $\overline{X}$ lie along the regression line and when R equals 0 there is no linear relationship between $X_k$ and $t_k$. A threshold $R_{th}$ (e.g., $R_{th}=0.6$) is used to determine whether or not the trend in the data is linear. When R is greater than $R_{th}$ it is assumed that the trend is linear. When the trend of the set of data $\overline{X}$, or the latest time portion of the $\overline{X}$, is not linear (i.e., $R<R_{th}$), the data is subjected to log-linear regression. For example, it may be the case that the relationship between $X_k$ and $t_k$ can be characterized by an exponential function $be^{ct}$, where b and c are constants. In this example, natural logarithms are applied to both $X_k$ and $t_k$ and linear regression is used to calculate a log-linear regression line. When the goodness-of-fit R is calculated for the log-linear regression line according to Equations (6a) and (6b) and R is greater than the threshold $R_{th}$, the set of data $\overline{X}$ is identified as log-linear. Finally, when the set of data $\overline{X}$, or the latest time portion of the data $\overline{X}$, is neither linear nor log-linear, the trend is identified as non-linear and the latest time portion of the set of data $\overline{X}$ is selected for analysis of extremes described below with the assumption that the data can be approximated by a linear trend.

Trend detection may be applied to a set of data $\overline{X}$ as follows. Assume that the overall set of data $\overline{X}$ has no linear trend. Using a time window $T_{window}$ (e.g., 1 week, 1 day, 1 hour), data points $X_k$ collected in the most recent time window $T_{window}$ of the set of data $\overline{X}$ are checked for a linear trend using linear regression. If the data points $X_k$ in the time window $T_{window}$ are not linear (i.e., $R<R_{th}$) then log-linear regression is used to check the data points $X_k$ in the same time window $T_{window}$ as described above. Alternatively, if the data points $X_k$ in the time window $T_{window}$ are linear (i.e., $R>R_{th}$), the time window may be expanded to $C \cdot T_{window}$, where $C>1$, and data points in the time window $C \cdot T_{window}$ are again checked using linear regression for linear trend. By this procedure, the longest and latest portion of data which has a linear trend may be collected for calculating a hard threshold below. If after a number of time window increases the data points in the time window fail to show a linear trend, the same procedure is applied to check for a log-linear trend.

After the trend in the set of data $\overline{X}$ has been identified as linear, log-linear, or non-linear, the trend for the set of data $\overline{X}$ is determined and subtracted from the set of data $\overline{X}$. For example, the trend may be a function of the linear or non-linear regression line. Non-trendy components of data points in a trendy set of data $\overline{X}$ are calculated as follows $$x(t_k)=X(t_k)-\text{trend}(t_k) \qquad (8)$$

Analysis of Extremes

Whether the set of data $\overline{X}$ is originally non-trendy or reduced to non-trendy after applying regression and subtraction of the trend according to Equation (8), a hard threshold is calculated by applying analysis of extremes to the non-trendy time-series data $x_k$. In particular, analysis of extremes is based on extreme value theory and is applied to the data "tail" of the non-trendy time-series data in accordance with one of two implementations. The first implementation constructs parametric equations and defines a data "tail" based on a measure of decay of the distances of data points over threshold ("POT"). The second implementation is a non-parametric procedure that defines the data "tail" based on a measure of uncertainty of POT. The level for which POTs indicate the maximum uncertainty is set as a basic threshold with further possible adjustments. These two alternative implementations of analysis of extremes are now described for calculating an upper hard threshold for a set of data $\overline{X}$, but as explained below, the two methods can be adapted to calculated a lower hard threshold for a set of data.

Data tails are produced from a set of data $\overline{X}$ for a number of different quantiles. A quantity $q_c$ is the c-th quantile of the time-series data $x_k$, where $0<c<1$. For example, for data sorted in ascending order, the quantile $q_c=x_{cN}$, where the product $c \cdot N$ is a natural number. Otherwise, if the product $c \cdot N$ is not a natural number, the natural number i that satisfies the condition $i<c \cdot N \leq i+1$ is used to calculate a line which passes through the data points $x(t_i)$ and $x(t_{i+1})$ (after sorting the data in ascending order) and the quantile $q_c$ may be assigned as $q_c=x_{i+1}(c \cdot N-i)+x_i(1-c \cdot N+i)$. In order to calculate an upper hard threshold, a number of data tails are calculated for different values of the quantile index c. The quantile index c s a number of selected from a subinterval $c_{min} \leq c \leq c_{max}$ of the interval [0,1]. For example, a subinterval $0.9 \leq c \leq 0.99$ may be used to select values for the quantile index. For each quantile index c, the corresponding data tail is composed of distances given by $$d_k^c = x_k - q_c > 0 \qquad (9)$$

In other words, in calculating an upper threshold, the data tail is composed of distances for data points $x_k$ greater than the quantile $q_c$ (i.e., $x_k > q_c$). The data tail for the c-th quantile $q_c$ is represented by a set $$\overline{X}_C = \{d_k^c\}_{k=1}^M \tag{10}$$

where M is the number of data points $x_k$ greater than $q_c$.

Figure 4:
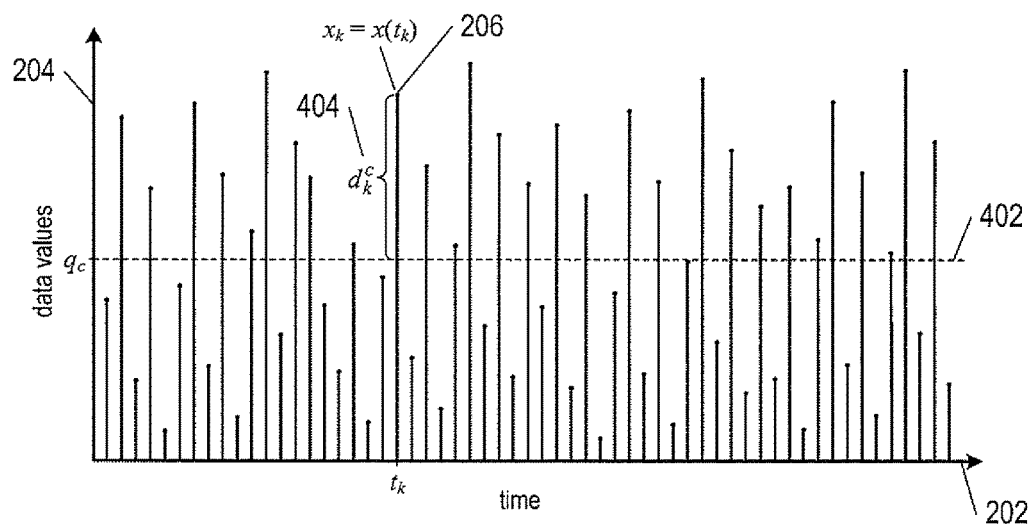
FIG. 4 shows an example plot of the non-trendy set of data shown in FIG. 2 with quantile depicted.

FIG. 4 shows an example plot of the non-trendy set of data shown in FIG. 2. Lines that extend from the time axis 202 to the data points represent the magnitudes of the data values. Dashed line 402 represents the c-th quantile $q_c$. The distance of the point 206 above the quantile $q_c$ is given by $d_k^c$ 404.

Figure 5:
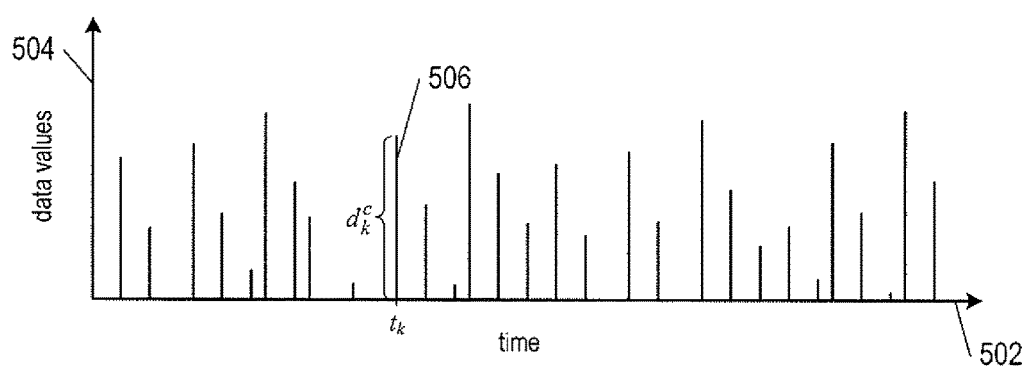
FIG. 5 shows an example plot of a data tail for the distances above the quantile shown in FIG. 4.

FIG. 5 shows an example plot of a data tail for the distances above the quantile $q_c$ 402 in FIG. 4. Horizontal axis 502 represents time, vertical axis 504 represents data values, and lines that extends from the time axis 502 represents the distances calculated according to Equation (8). For example, line 506 represents the distance $d_k^c$ of the data point 206 above the quantile 402 shown in FIG. 4. The distances shown in FIG. 5 are collected to form a data tail $\overline{X}_C$ associated with the c-th quantile $q_c$ 402 for the time-series data shown in FIG. 2.

A histogram of normalized distances is formed for each data tail $\overline{X}_C$. Each histogram is formed by dividing the range of distance values in a data tail $\overline{X}_C$ into n subintervals (i.e., bins). The fraction of distances in each subinterval is calculated by counting the number of distances in the data tail $\overline{X}_C$, that lie within each subinterval, and dividing the number of distances counted for each subinterval by the total number of distances in the set $\overline{X}_C$. The fraction of distances calculated for each subinterval is a probability denoted by $v_l$, where $0 \le v_l \le 1$ for a subinterval index $l=1, \ldots, n$. The probability $v_l$ associated with the l-th subintervals represents the probability that a randomly selected distribution d from the data tail $\overline{X}_C$ lies within the l-th subinterval.

Figure 6:
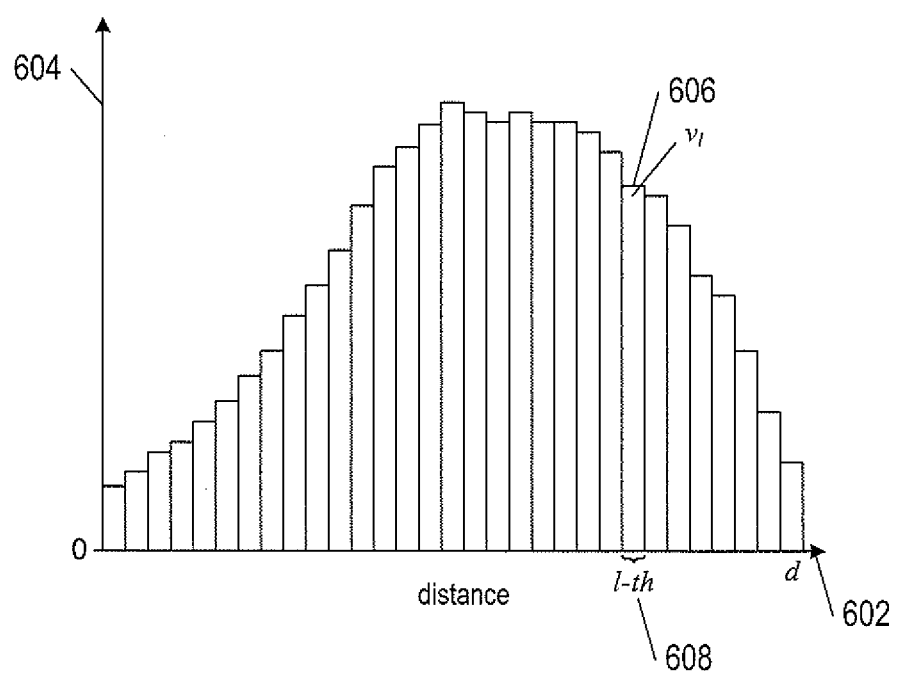
FIG. 6 shows an example plot of a histogram of distances.

FIG. 6 shows an example plot of a histogram of distances in a data tail $\overline{X}_C$. Horizontal axis 602 represents a range of distance values for distances in the data tail $\overline{X}_C$, and vertical axis 604 represents real numbers greater than 0. Bars, such as bar 606, represent the probability $v_l$ of a distance d randomly selected from the data tail $\overline{X}_C$ lies in the l-th subinterval 608.

I. Parametric Implementation

The parametric implementation is predicated on an assumption of decay represented by $$M \to 0 \text{ as } c \to 1 \tag{11}$$

In other words, the volume (i.e., cardinality) of the data tails $\overline{X}_C$ approaches zero as the quantile index c approaches one. The average decay is determined by a predefined family of distributions. In the case of power law, the Cauchy distribution can be used. In case of sub-exponential decay, a Generalized Pareto ("GP"), Generalized Extreme Value ("GEV"), Weibull, or other distributions may be used to represent the distribution of distances in the data tail $\overline{X}_C$.

When a data tail over a given quantile is appropriately fitted by a selected parametric model, the POTs behave as "outliers." As a result, a lowest quantile with this property is the upper hard threshold that can be assigned to the time-series data for further adjustments. In other words, the quantile serves as a threshold for data points that violate (i.e., greater than in the case upper hard thresholds and less than in the case of lower hard thresholds) the quantile. The data tail $\overline{X}_C$ is composed of points that violate the quantile. For each data tail $\overline{X}_C$ generated according to Equations (9) and (10), an empirical cumulative distribution $F_{emp}^c$ is derived to serve as a parametric model for each data tail $\overline{X}_C$. Each empirical cumulative distribution $F_{emp}^c$ associated with a data tail $\overline{X}_C$ may be calculated from a corresponding probability density function $f_{emp}^c$ that characterizes the random distribution of distances in the data tail $\overline{X}_C$. The cumulative distribution $F_{emp}^c(d)$ gives the probability that a data point $x_k$ that is greater than the corresponding quantile $q_c$ will have a distance $d_k^C$ less than or equal to a distance d. Each probability density function $f_{emp}^c$ can be interpolated or estimated from the histogram of a data tail $\overline{X}_C$. The probability density function can be obtained using density estimation of the histogram or by fitting a polynomial to the probabilities of the histogram.

Figure 7:
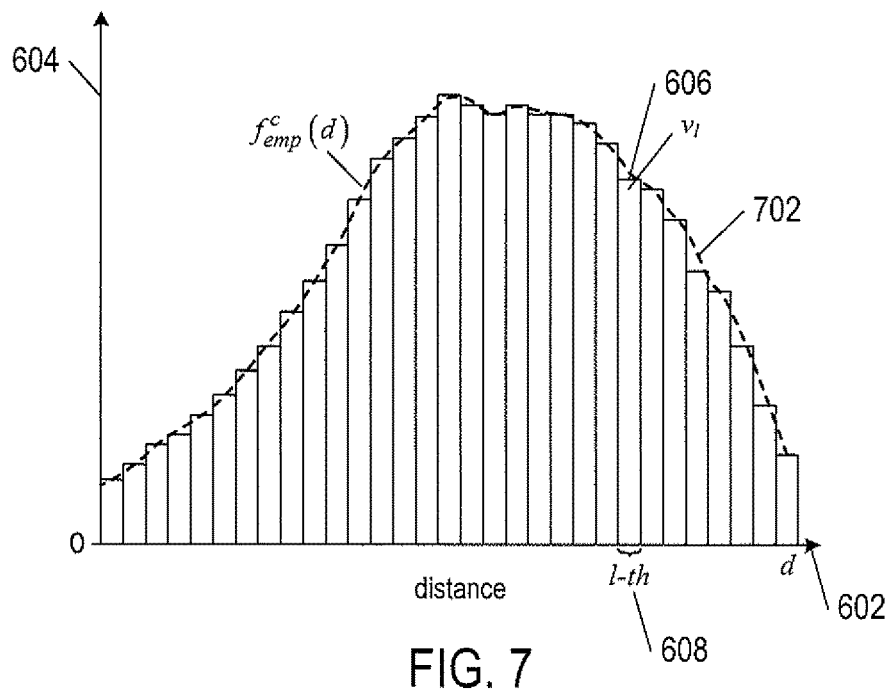
FIG. 7 shows an example of empirical density function fit to the histogram of distances shown in FIG. 6.

FIG. 7 shows an example empirical density function fit to the histogram shown in FIG. 6. Dashed curve 702 that passes through the probabilities $v_l$ represented by the bars represents an interpolated probability density function $f_{emp}^c$ that characterizes the probability of the random distribution of distances in the data tail $\overline{X}_C$.

The empirical cumulative distribution $F_{emp}^c$ characterizes the probability that the random distances in the data tail $\overline{X}_C$ will be found to have a value less than or equal to distance d. An empirical cumulative distribution $F_{emp}^c$ can be represented mathematically as the integral of a probability density function $f_{emp}^c$ as follows:

$$F_{emp}^c(d) = \int_0^d du \cdot f_{emp}^c(u) \tag{12}$$

where x represents distance along the axis 602 in FIG. 6. An empirical cumulative distribution $F_{emp}^c$ may be calculated from a probability density function $f_{emp}^c(u)$ using any one of many different numerical integration techniques. Alternatively, an empirical cumulative distribution $F_{emp}^c$ may be calculated as a sum of the probabilities $v_l$ up to a distance d as follows:

$$F_{emp}^c(d) \approx \sum_{l=1}^d v_l \tag{13}$$

As a result, an empirical cumulative distribution $F_{emp}^c$ is constructed for each data tail $\overline{X}_C$. The empirical cumulative distributions form a set represented by $$\overline{F}_{emp} = \{F_{emp}^c\}_{c_{min}}^{c_{max}} \tag{14}$$

for each value of c in the subinterval $c_{min} \le c \le c_{max}$.

Next, for each empirical cumulative distribution $F_{emp}^c$, a parametric cumulative distribution $F_{par}^c$ is calculated by an appropriate selection of the parametric cumulative distribution parameters. In other words, the parameters associated with a parametric cumulative distribution $F_{par}^c$ are calculated so that the parametric cumulative distribution $F_{par}^c$ approximates an empirical cumulative distribution $F_{emp}^c$.

Figure 8:
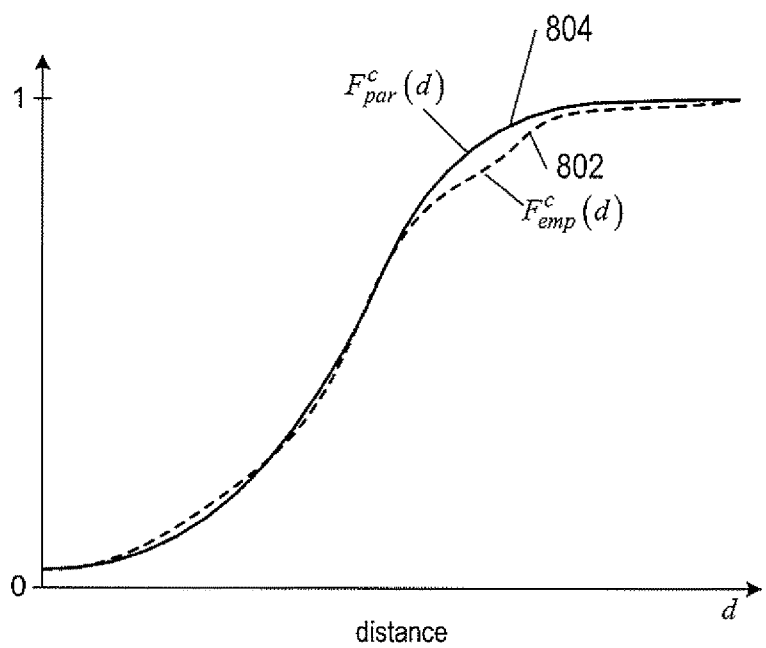
FIG. 8 shows a plot of an empirical cumulative distribution and a corresponding parametric cumulative distribution.

FIG. 8 shows a plot of an empirical cumulative distribution $F_{emp}^c$ represented by dashed curve 802 and a corresponding parametric cumulative distribution $F_{par}^c$ represented by curve 804. The parametric cumulative distribution $F_{par}^c$ 804 is obtained by calculating the parametric cumulative distribution parameters as a best fit to the empirical cumulative distribution $F_{emp}^c$.

The type of parametric cumulative distribution selected for a particular data tail $\overline{X}_C$ is based primarily on the shape of the histogram of the data tail $\overline{X}_C$. Initially, the Cauchy distribution is used as a parametric cumulative distribution $F_{par}^c$ to characterize the distribution of distances d of a data tail $\overline{X}_C$ is given by $$F_{par}^c(d) = \frac{1}{\pi}\arctan\left(\frac{d-d_0}{\gamma}\right) + \frac{1}{2} \quad (15)$$

where $d_0$ is a location parameter; and
$\gamma$ is a scale parameter.

The parameters $d_0$ and $\gamma$ are determined as a best fit to an empirical cumulative distribution $F_{emp}^c$ for a given c (i.e., quantile $q_c$). If attempting to the fit the Cauchy distribution fails, other distributions may be used.

Examples of other distributions that may to be used when the Cauchy distribution fails includes the generalized Pareto ("GP") and the generalized extreme value ("GEV") distributions. The GP distribution is given by:

$$F_{par}^c(d) = 1 - \left(1 - \frac{\gamma d}{\sigma}\right)^{\frac{1}{\gamma}} \quad (16a)$$

for $\lambda \neq 0$ and $\sigma > 0$; and $$F_{par}^c(d) = 1 - e^{-\frac{d}{\sigma}} \quad (16b)$$

for $\lambda = 0$ and $\sigma > 0$,
where $d \geq 0$ if $\gamma \leq 0$; and
$0 \leq d \leq \frac{\sigma}{\gamma}$ if $\gamma > 0$.

The parameters $\gamma$ and $\sigma$ of the GP distribution are determined as a best fit to an empirical cumulative distribution $F_{emp}^c$ for a given c (i.e., quantile $q_c$). The GEV distribution is given by:

$$F_{par}^c(d) = \exp\left\{-\left[1 + \xi\left(\frac{d-\mu}{\sigma}\right)\right]^{-\frac{1}{\xi}}\right\} \quad (17a)$$

for $$1 + \xi\left(\frac{d-\mu}{\sigma}\right) > 0,$$

where $\xi \neq 0$ is the shape parameter, $\mu$ is a location parameter, and $\sigma > 0$; and $$F_{par}^c(x) = \exp\left\{-\exp\left(-\frac{d-\mu}{\sigma}\right)\right\} \quad (17b)$$

for $\xi = 0$.

The parameters $\mu$, $\sigma$, $\xi$ of the GEV distribution are determined as a best fit to the empirical cumulative distribution $F_{emp}^c$ for a given quantile $q_c$.

A parametric cumulative distribution $F_{par}^c$ is constructed for each data tail $\overline{X}_C$ based on obtaining a best fit of the parametric cumulative distribution parameters to the empirical cumulative distribution $F_{emp}^c$ obtained for the same data tail $\overline{X}_C$. As a result, a set of parametric cumulative distributions is formed and represented by $$\overline{F}_{par} = \{F_{th}^c\}_{c_{min}}^{c_{max}} \quad (18)$$

for each quantile index c in the subinterval $c_{min} \leq c \leq c_{max}$.

For each quantile index c, a relative error between a parametric cumulative distribution $F_{par}^c$ and a corresponding empirical distribution $F_{emp}^c$ is calculated as follows:

$$r = \frac{std(F_{emp}^c - F_{par}^c)}{std(F_{emp}^c)} \quad (19)$$

where "std" represents the standard deviation

When the relative error r is less than a relative-error threshold $T_r$ (i.e., $T_r=0.1$), the parametric cumulative distribution $F_{par}^c$ is considered a satisfactory fit to the empirical cumulative distribution $F_{emp}^c$. Otherwise, the parametric distribution $F_{par}^c$ is considered an unsatisfactory fit to the empirical cumulative distribution $F_{emp}^c$. When none of the parametric cumulative distributions in Equation (18) are less than the relative-error threshold, no hard threshold can be calculated using the parametric implementation.

In calculating an upper hard threshold, parametric cumulative distributions in the set of parametric distributions $\overline{F}_{par}$ with corresponding relative errors less than the relative error threshold $T_r$ are identified. The parametric cumulative distribution, $F'_{par}^c$, with the lowest corresponding quantile index c is used to calculate the hard threshold as follows:

$$T = (F'_{par}^c)^{-1}(a) \quad (20)$$

where $a$ is a user-defined risk confidence level with $0 \leq a \leq 1$.

If the relative errors of the parametric cumulative distributions comprising the set $\overline{F}_{th}$ are greater than the relative-error threshold $T_r$, then the set of data $\overline{X}$ represented by Equation (2) is considered intractable for the parametric implementation.

Alternatively, in calculating an upper hard threshold, parametric cumulative distributions in the set of parametric distributions $\overline{F}_{par}$ with corresponding relative errors less than the relative-error threshold $T_r$ are identified, but the inverse of the parametric cumulative distribution, $F'_{par}^c$, with the lowest relative error r is used to calculate the hard threshold according to Equation (20).

II. Non-Parametric Implementation

The non-parametric implementation for calculating a hard threshold is based on calculating an entropy of each data tail $\overline{X}_c$ obtained as described above with regard to Equations (9) and (10). For each data tail $\overline{X}_c$, the entropy is calculated as follows:

$$H(\overline{X}_c) = -\sum_{l=1}^{n} v_l \log_n v_l \quad (21)$$

The entropy calculated for each data tail $\overline{X}_c$ is compared to an entropy threshold $T_H$ (e.g., $T_H=0.5$). The maximum entropy $H_{max}(\overline{X}_{c*})$ for a quantile index $c*$ (i.e., quantile $q_{c*}$) in the subinterval $c_{min} \leq c \leq c_{max}$ that is greater than the entropy threshold $T_H$ is used to calculate a hard threshold for the set of data $\overline{X}$. In other words, a maximum entropy $H_{max}(\overline{X}_{c*})$ is the portion of the set of data $\overline{X}$ that is maximally away from dominating concentrations and having the largest random distribution. This portion represents the outlying behavior of the original set of data $\overline{X}$ and the corresponding hard threshold gives the best partition for time-independent anomaly detection.

Note that, in practice, there may be two or more maximum entropies for different quantile indices. When there are two or more maximum entropies, the largest quantile index (i.e., quantile) of the corresponding two or more quantile indices is selected. For example, suppose $H_{max}(\overline{X}_{c*}) = H_{max}(\overline{X}_{\tilde{c}})$ where $c* > \tilde{c}$ (i.e., $q_{c*} > q_{\tilde{c}}$). The quantile $q_{c*}$ is selected to calculate a hard threshold. One the other hand, when there is no maximum entropy (i.e., $H_{max}(\overline{X}_{c*})$=constant) for all c in the subinterval $c_{min} \leq c \leq c_{max}$, or the maximum value $H_{max}(\overline{X}_{c*})$ is less than $T_H$, the set of data $\overline{X}$ is considered intractable for the non-parametric implementation.

Figure 9:
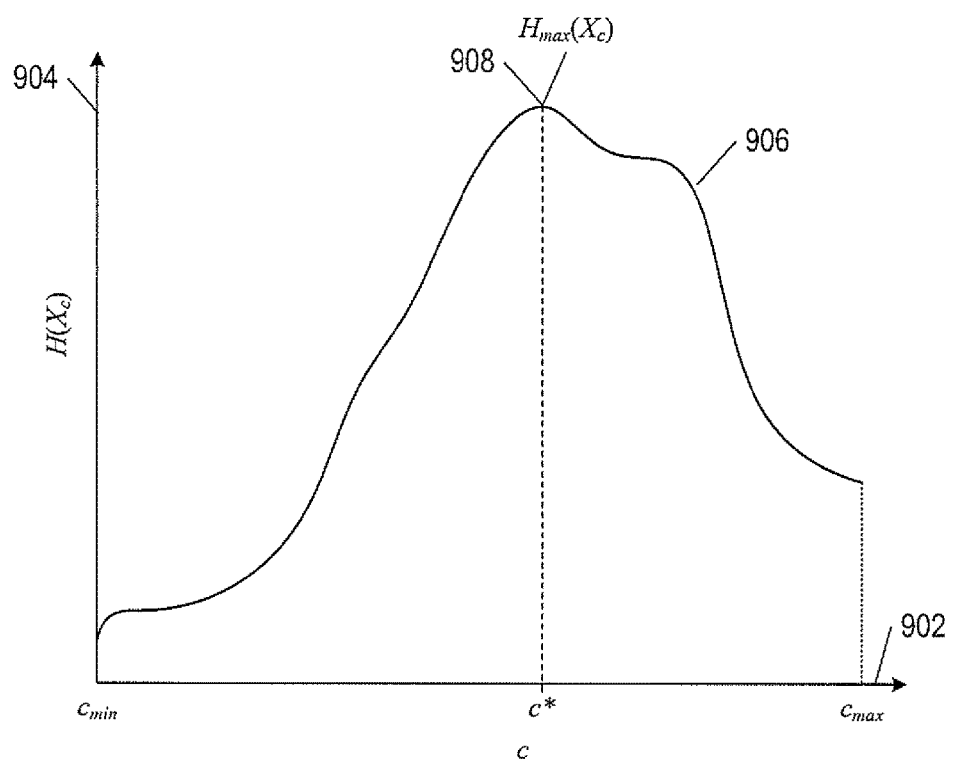
FIG. 9 shows a plot of entropies.

FIG. 9 shows a plot of entropies for each set $\overline{X}_c$. Horizontal axis 902 represents the interval $c_{min} \leq c \leq c_{max}$, and vertical axis 904 represents entropy. Curve 906 represents the entropy calculated according to Equation (21) for each set $\overline{X}_c$. Point 908 is the maximum entropy $H_{max}(\overline{X}_{c*})$, which corresponds to a value c* and a quantile $q_{c*}$.

After a quantile index c* that corresponds to the maximum entropy $H_{max}(\overline{X}_{c*})$ has been obtained, an empirical cumulative distribution $F_{emp}^{c*}$ is calculated according to Equation (12) or Equation (13) from the histogram associated with the data tail $\overline{X}_{c*}$. The inverse of the empirical cumulative distribution $F_{emp}^{c*}$ is used to calculate the hard threshold as follows:

$$T_0 = (F_{emp}^{c*})^{-1}(a) \quad (22)$$

for the user-defined risk confidence level a.

Either the hard threshold T calculated according to Equation (20) or the hard threshold $T_0$ calculated according to Equation (22) can be used to generate alerts when time-series data generated by the data-generating entity violates the hard threshold. For example, when the time-series data violates the hard threshold (either T or $T_0$) for a minimum number of time stamps, $t_k$, an alert is generated. If the data returns to normal for a minimum number of stamps after the alert, the alert may be cancelled. Otherwise, if the data continues to violate the threshold within the minimum number of alerts for cancelling the alert, the alert may be displayed to a user.

The parametric and non-parametric implementations described above can be modified to calculate a lower hard threshold. For the parametric implementation, the decay is represented by $$M \to 0 \text{ as } c \to 0 \quad (23)$$

In particular, in forming the data tails used to calculate a lower hard threshold, the subinterval $c_{min} \leq c \leq c_{max}$ of the interval [0,1] is located closer to 0. For example, the subinterval may be $0.01 \leq c \leq 0.1$. For each quantile index c, the corresponding data tail is composed of distances given by $$d_k^c = q_c - x_k > 0 \quad (24)$$

In other words, in calculating a lower hard threshold, a data tail is composed of distances for data points $x_k$ less than the quantile $q_c$ (i.e., $q_c > x_k$). In applying the parametric implementation to calculate a lower hard threshold, a set of parametric cumulative distributions $\overline{F}_{par}$ and relative errors r are calculated as described for the upper hard threshold. The parametric cumulative distributions in the set of parametric distributions $\overline{F}_{th}$ with corresponding relative errors less than the relative error threshold $T_r$ are identified, but the parametric distribution, $F''_{par}^c$, with the highest corresponding c is used to calculate the hard threshold as follows:

$$T = (F''_{par}^c)^{-1}(a) \quad (25)$$

The non-parametric implementation is not changed to calculate the lower hard threshold.

The parametric and non-parametric implementations for calculating a hard threshold do not necessarily result in the same hard threshold for the same set of data $\overline{X}$ and the associated quantile indices may be different. In other words, when the same set of data $\overline{X}$ is used to calculate a hard threshold T according the parametric implementation and calculate a hard threshold $T_0$ according the non-parametric implementation, the two hard thresholds and associated quantiles may be different.

Although the parametric and non-parametric implementations may result in different hard thresholds, one implementation can be used when the other implementation fails. For example, if the parametric implementation fails to produce a parametric distribution $F_{par}^c$ for all quantile indices c in the subinterval $c_{min} \leq c \leq c_{max}$, then the non-parametric implementation may be used to calculate the hard threshold. On the other hand, if the non-parametric implementation fails to produce a maximum entropy or the maximum entropy is less than the entropy threshold, then the parametric implementation may be used to calculate a hard threshold.

Figure 10:
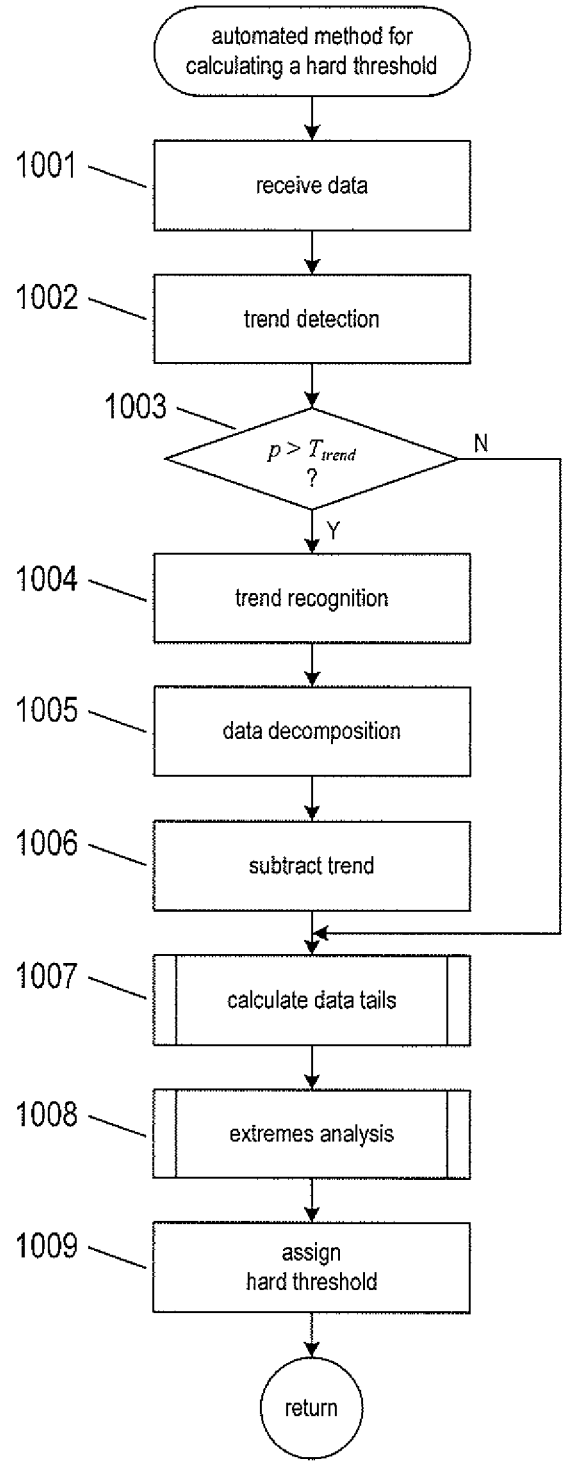
FIG. 10 shows a flow-control diagram of an automated method for calculating a hard threshold.

FIG. 10 shows a flow-control diagram of an automated method for calculating a hard threshold. In block 1001, a set of data associated with a data-generating entity is received. The set of data can be time-series data as described above with reference to Equations (1) and (2). The set of data may include a trend component as described above with reference to FIG. 3. In block 1002, trend detection is applied to the set of data to calculate trend measure p as described above with reference to Equation (5). In decision block 1003, when the trend measure p is greater than a trend threshold $T_{trend}$ (e.g., $T_{trend}$=60%) the set of data is categorized as trendy data and control flows to block 1004. Otherwise, the set of data is categorized as non-trendy data and control flows to block 1007. In block 1004, trend recognition is applied to the set of data in order to identify the set of data at linear, log-linear, or non-linear. In blocks 1005 and 1006, the trend is calculated and subtracted from the set of data to given a non-trendy set of data as described above with reference to Equation (8). In block 1007, a routine "calculate data tails" is called to calculate a number of data tails for the set of data as described below with reference to FIG. 11. In block 1008, a routine "extremes analysis" is called to calculate the hard threshold. The routine "extreme analysis" can be a parametric implementation of extremes analysis described below with reference to a flow-control diagram in FIG. 12. Alternatively, the routine "extremes analysis" can be a non-parametric implementation of extremes analysis described below with reference to a flow-control diagram in FIG. 12. In an alternative implementation, the routine "extremes analysis" can be executed as a combination of the parametric and non-parametric implementations as described below with to the flow-control diagram in FIG. 14. In block 1009, the hard threshold output from the routine "extremes analysis" can be used as the hard threshold to assess time-series data output from the data-generating entity. If the set of data is trendy as determined in block 1004, the trend calculated in block 1006 is added to the hard threshold.

Figure 11:
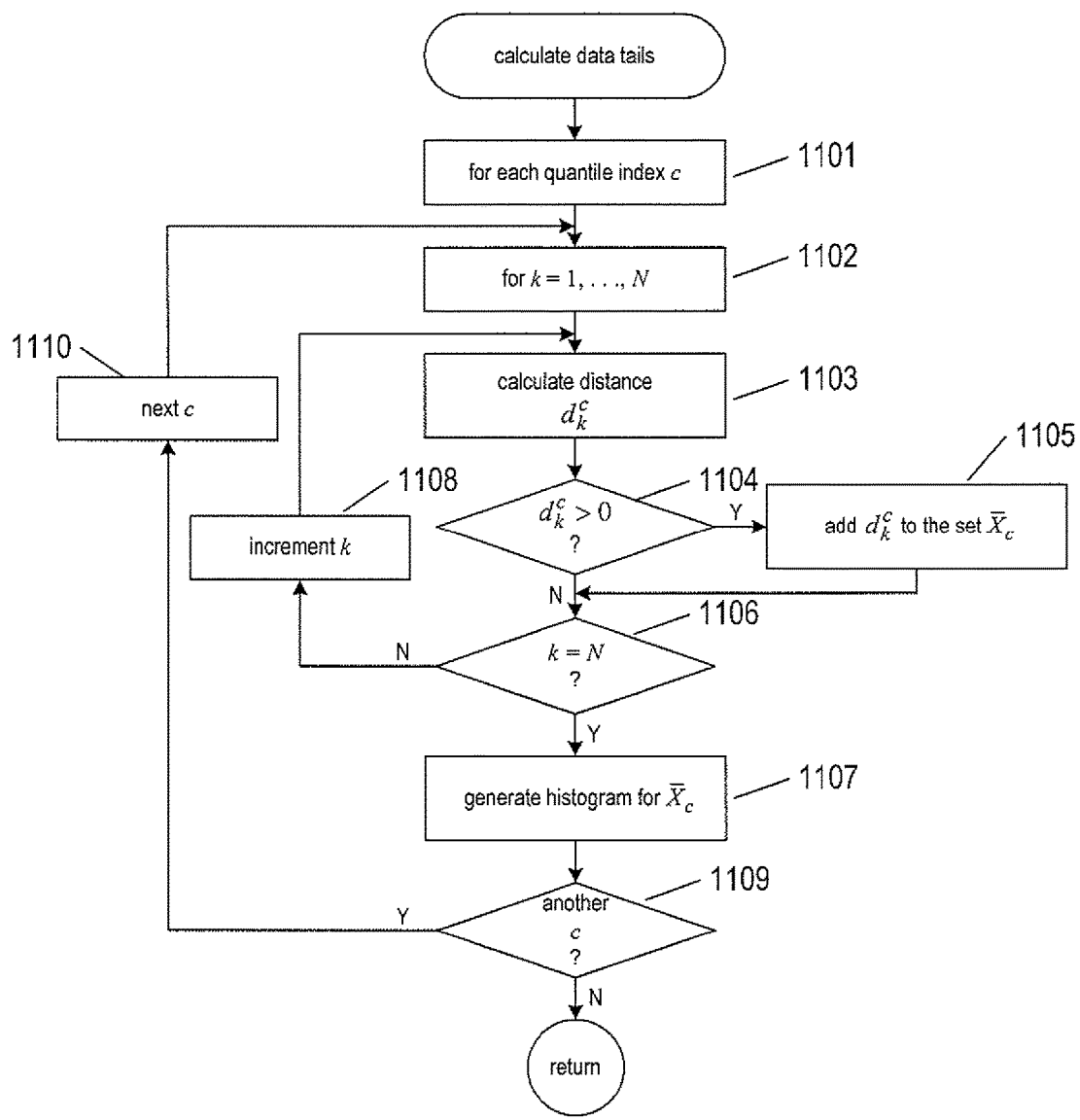
FIG. 11 shows a flow-control diagram of the routine "calculate data tails" called in block 1007 of FIG. 10.

FIG. 11 shows a flow-control diagram of the routine "calculate data tails" called in block 1007 of FIG. 10. A for-loop begins with block 1101 with operations in blocks 1102-1110 executed for each quantile index c in a subinterval $c_{min} \leq c \leq c_{max}$ of the interval [0,1]. When the hard threshold to be calculated is an upper hard threshold, the subinterval is located closer to 1. For example, when calculating an upper hard threshold, a suitable subinterval to select quantile indices c from is $0.9 \leq c \leq 0.99$. On the other hand, when the hard threshold to calculated is a lower hard threshold, the subinterval is located closer to 0. For example, when calculating a lower hard threshold, a suitable subinterval to select quantile indices c from is $0.01 \leq c \leq 0.1$. A for-loop begins with block 1102 with operations in blocks 1103-1108 executed for each data point in the set of data, where k is a data point index and N is the number of data points in the set of data. In block 1103, a distance is calculated from a data point $x_k$ to a quantile $q_c$. In the case of an upper hard threshold, the distances are calculated according to Equation (9) for data points $x_k$ greater than the quantile $q_c$. In the case of a lower hard threshold, the distances are calculated according to Equation (24) for data points $x_k$ less than the quantile $q_c$. In decision block 1104, when a distance is greater than zero, control flows block 1105 where the distances are collected to form a data tail $\overline{X}_c$. Otherwise, control flows to decision block 1106. In decision block 1106, when the data point index k equals N, control flows to block 1107. Otherwise, k is incremented in block 1108 and the operations associated with blocks 1103-1106 are executed for another data point. In block 1107, when formation of the data tail $\overline{X}_c$ is complete from blocks 1102-1106 and 1108, a histogram is generated as described above with reference to FIG. 6. In decision block 1109, when another quantile index c is available, the next quantile index is selected from the subinterval in block 1110 and the operations associated with blocks 1102-1108 are repeated.

Figure 12:
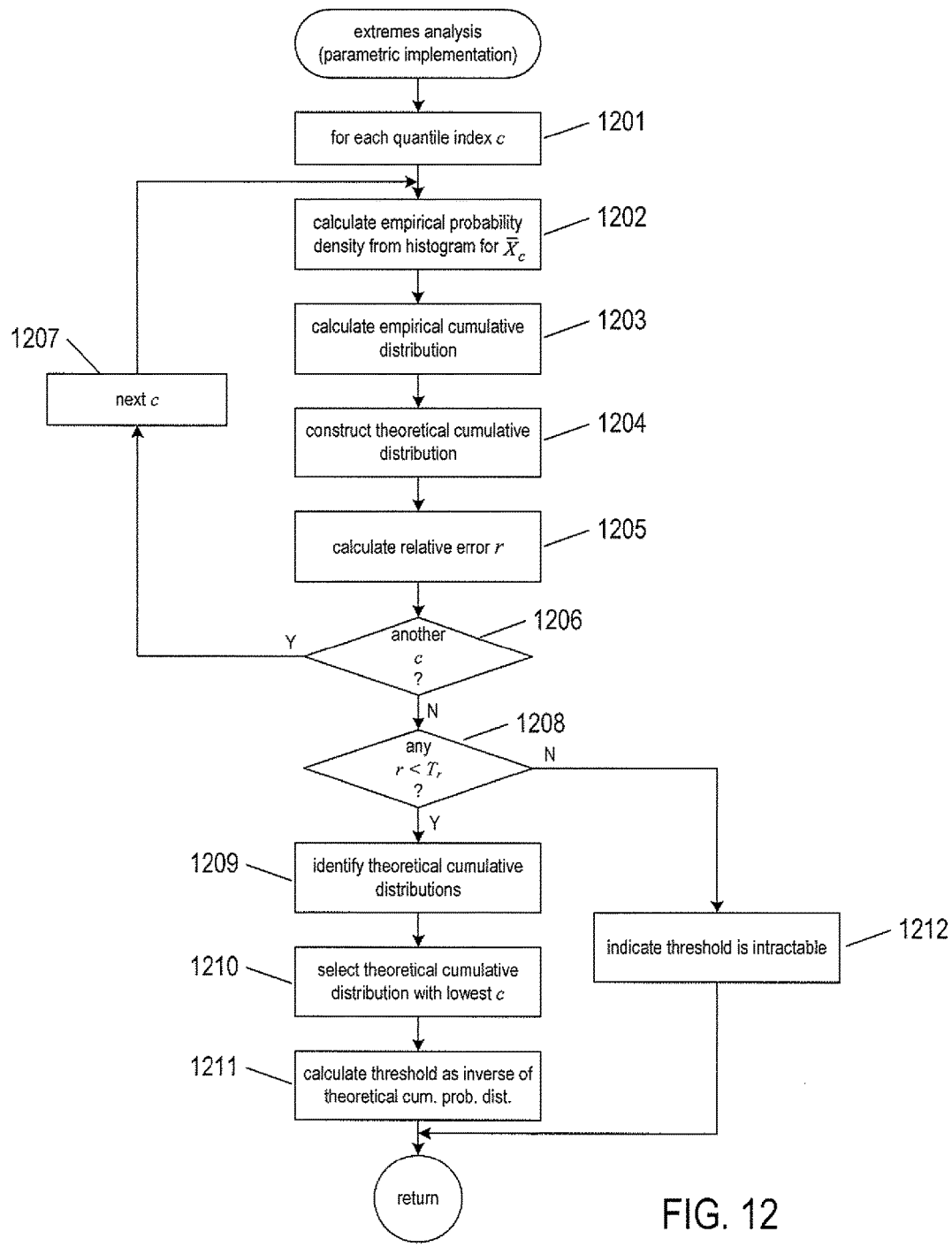
FIG. 12 shows a flow-control diagram of a parametric implementation of the routine "extremes analysis" called in block 1008 of FIG. 10.

FIG. 12 shows a flow-control diagram of a parametric implementation of the routine "extremes analysis" called in block 1008 of FIG. 10. A for-loop begins with block 1201 with operations in blocks 1202-1207 executed for each quantile index c in the subinterval $c_{min} \leq c \leq c_{max}$ of the interval [0,1]. In block 1202, an empirical probability density function $f_{emp}^c$ is calculated from the histogram of the data tail $\overline{X}_c$ as described above with reference to FIG. 7. In block 1203, an empirical cumulative distribution $F_{emp}^c$ is calculated from the probability density function $f_{emp}^c$ as described above with reference to Equation (12) using numerical integration. In block 1204, a parametric cumulative distribution $F_{par}^c$ is calculated from the empirical cumulative distribution $F_{emp}^c$ as described above with reference to the Cauchy distribution represented by Equation (15), the GP distribution represented by Equations (16a) and (16b), or the GEV distribution represented by Equations (17a) and (17b). In block 1205, the relative error r is calculated as described above with reference to Equation (19) for the empirical and parametric cumulative distributions calculated in blocks 1203 and 1204. In decision block 1206, when another quantile index c is available, the next quantile index is selected from the subinterval in block 1207 and the operations associated with blocks 1202-1206 are repeated. Otherwise, control flows to decision block 1206 in which the relative errors are compared with a relative-error threshold $T_r$. If there are any relative errors less than the threshold, control flows to block 1209 in which parametric cumulative distributions with relative errors less than the relative-error threshold are identified. In block 1210, when an upper hard threshold is desired, the parametric cumulative distribution with the lowest quantile index for relative errors less than the relative-error threshold is identified. When a lower hard threshold is desired, the parametric cumulative distribution with the highest quantile index for relative errors less than the relative-error threshold is identified. In block 1211, the inverse of this parametric cumulative distribution is used to calculate an upper hard threshold for a predefined confidence level. In block 1212, an indication is given that calculation of the threshold is intractable.

Figure 13:
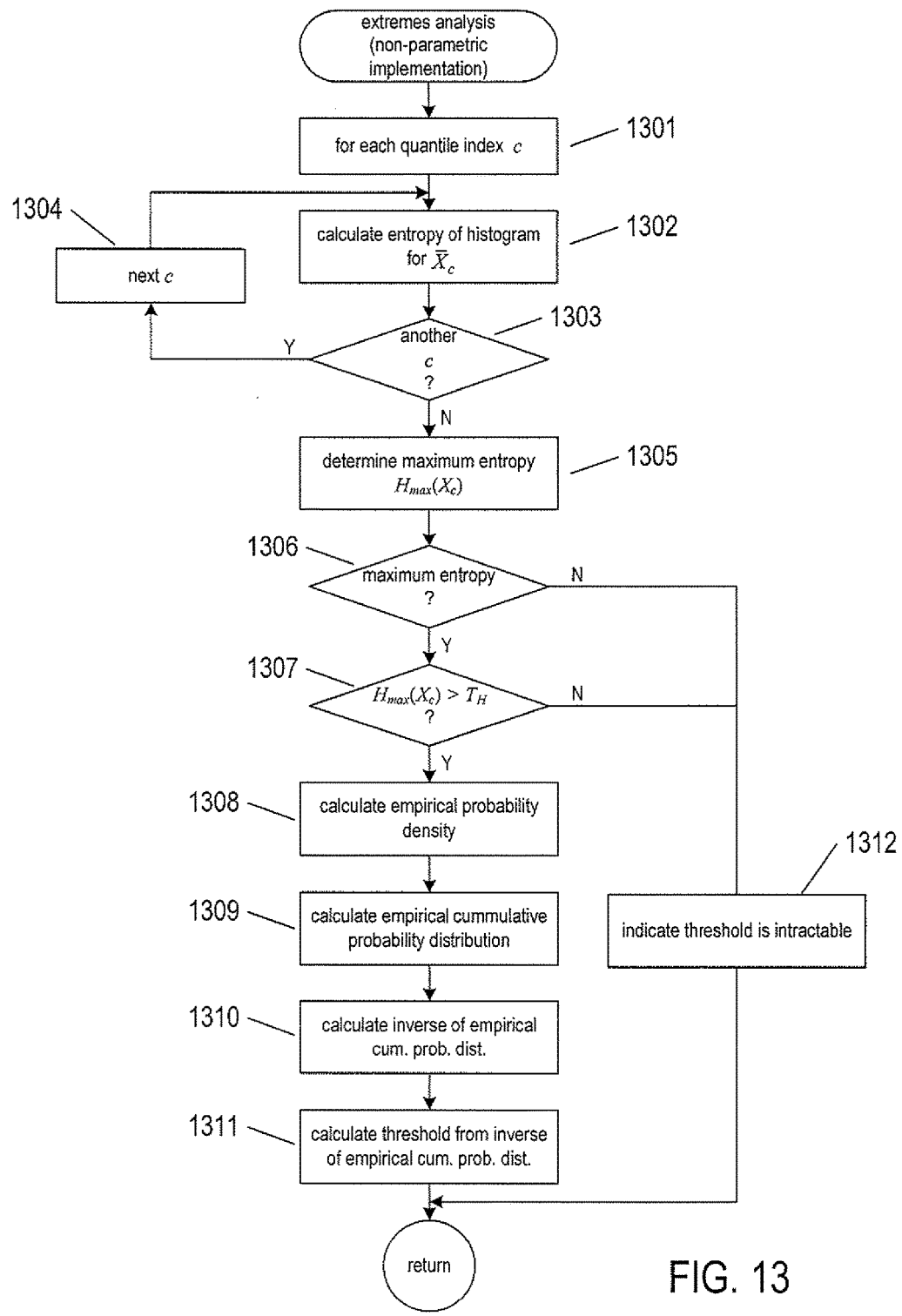
FIG. 13 shows a flow-control diagram of a non-parametric implementation of the routine "extremes analysis" called in block 1008 of FIG. 10.

FIG. 13 shows a flow-control diagram of a non-parametric implementation of the routine "extremes analysis" called in block 1008 of FIG. 10. A for-loop begins with block 1301 with operations in blocks 1302-1304 executed for each quantile index c in the subinterval $c_{min} \leq c \leq c_{max}$ of the interval [0,1]. In block 1302, the entropy is calculated from a histogram of a data tail $\overline{X}_c$ as described above with reference to Equation (21). In decision block 1302, when another quantile index c is available, the next quantile index is selected from the subinterval in block 1304 and the operations associated with blocks 1302-1303 are repeated. In block 1305, the entropies calculated in block 1302 are checked for one or more maximum entropies $H_{max}(\overline{X}_{c*})$. In decision block 1306, if no maximum entropy exists, control flows to block 1312. Otherwise, a maximum entropy exists and control flows to decision block 1307 in which the maximum threshold is compared with an entropy threshold $T_H$ (e.g., $T_H=0.5$). When the maximum entropy is greater than the entropy threshold, control flows to block 1308. Otherwise, control flows to block 1312. In block 1312, an indication is given that calculation of the threshold is intractable. In block 1308, an empirical probability density $f_{emp}^{c*}$ is calculated from the histogram associated with the maximum entropy. If there are two or more maximum entropies, the empirical probability density $f_{emp}^{c*}$ is calculated from the histogram associated with the largest quantile index of the two or more maximum entropies. In block 1309, an empirical cumulative distribution $F_{emp}^{c*}$ is calculated according to Equation (12) or Equation (13) from the probability density function. In block 1310, an inverse of the empirical cumulative distribution is calculated as used to calculate a hard threshold according to Equation (22) for a risk confidence parameter.

Figure 14:
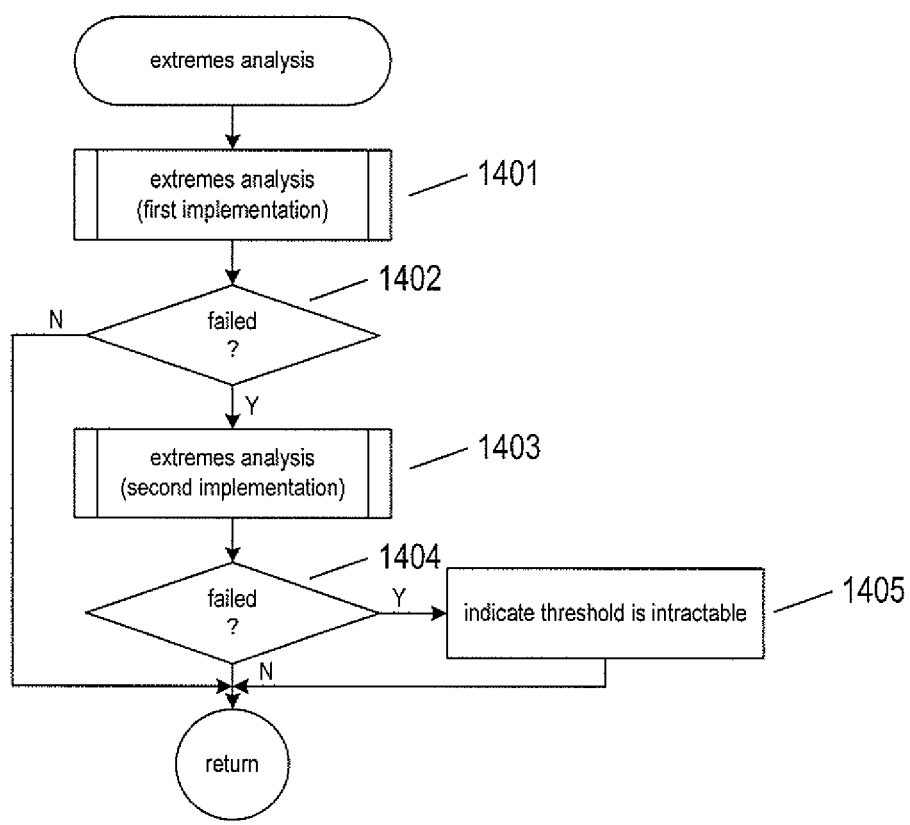
FIG. 14 shows a flow-control diagram of the routine "extremes analysis" called in block 1008 of FIG. 10.

FIG. 14 shows a flow-control diagram of the routine "extremes analysis" called in block 1008 of FIG. 10 in which the parametric and non-parametric implementations of the analysis of extremes are used as alternatives should one of the implementations fail to produce a hard threshold. In block 1401, one of the routines "extremes analysis" described above in FIGS. 12 and 13 is called to perform extremes analysis. In decision block 1402, when the routine finds calculation of the hard threshold intractable, control flows to block 1403. Otherwise, the hard threshold calculated in block 1401 is returned. In block 1403, the other of the two routines "extremes analysis" described above in FIGS. 12 and 13 is called to perform extremes analysis. In decision block 1402, when the routine finds calculation of the hard threshold intractable, control flows to block 1405 in which an indication is given that calculation of the threshold is intractable for both implementations. Otherwise, the hard threshold calculated in block 1403 is returned.

Computational Results

Figure 15:
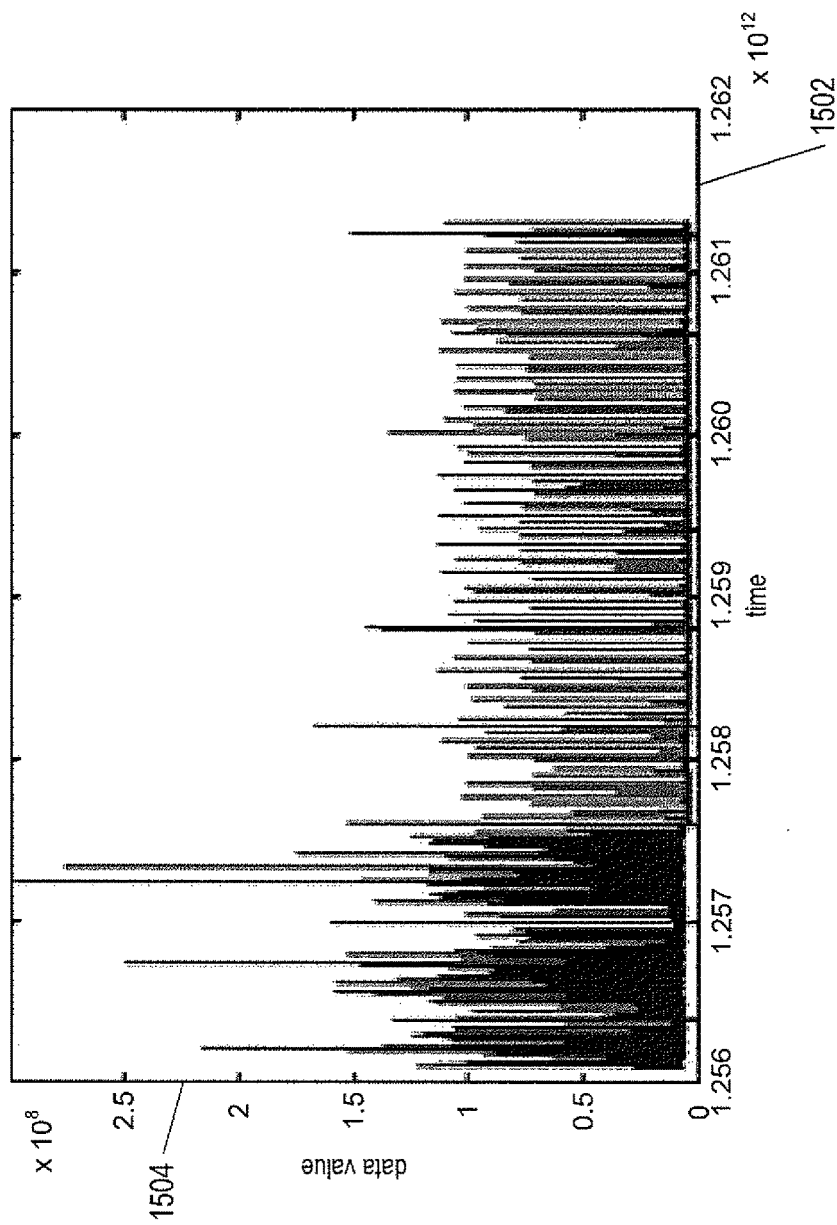
FIG. 15 shows a plot of a non-trendy set of data collected for a data-generating entity.

FIG. 15 shows a plot of an actual non-trendy set of data collected for a data-generating entity. Horizontal axis 1502 represents time, and vertical axis 1504 represents a range of data values for the set of data. The parametric and non-parametric implementations described above were used to calculate upper hard thresholds for the set of data shown in FIG. 15 using the quantile index c subinterval $0.90 \leq c \leq 0.99$.

Figure 17:
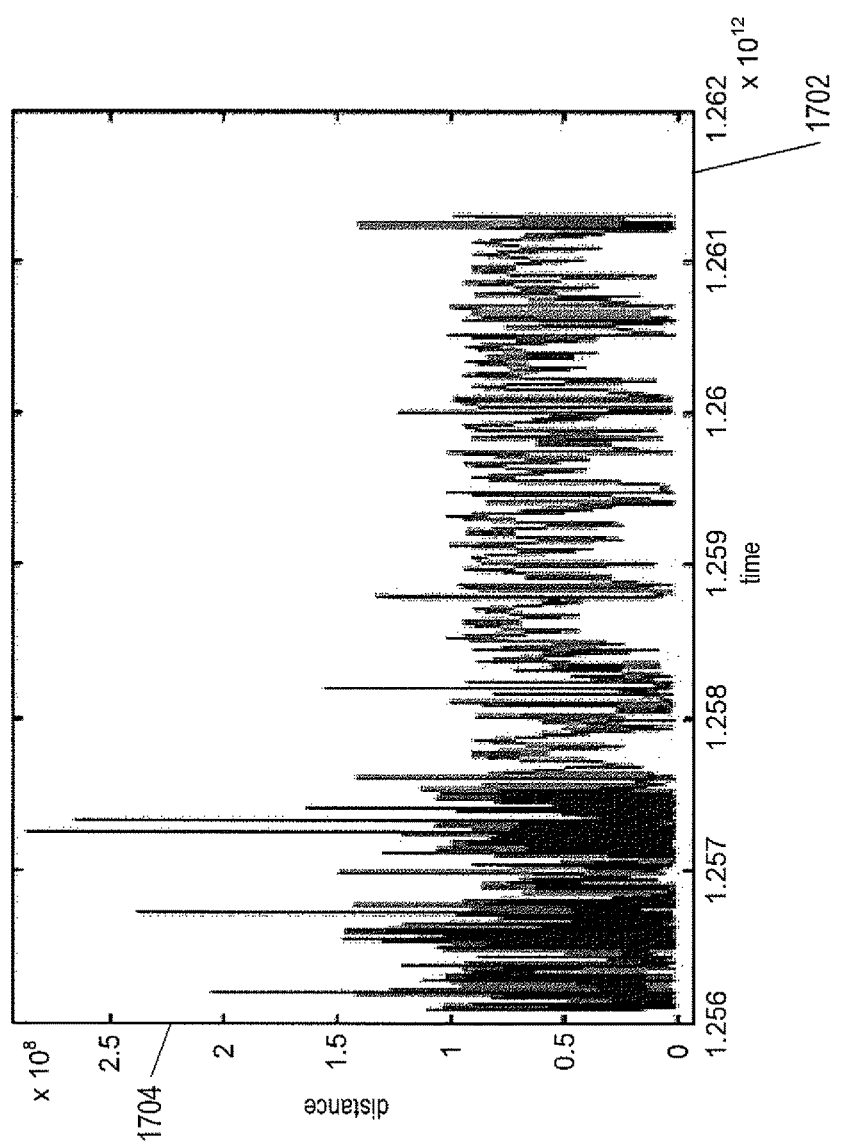
FIG. 17 shows a data tail.
Figure 18:
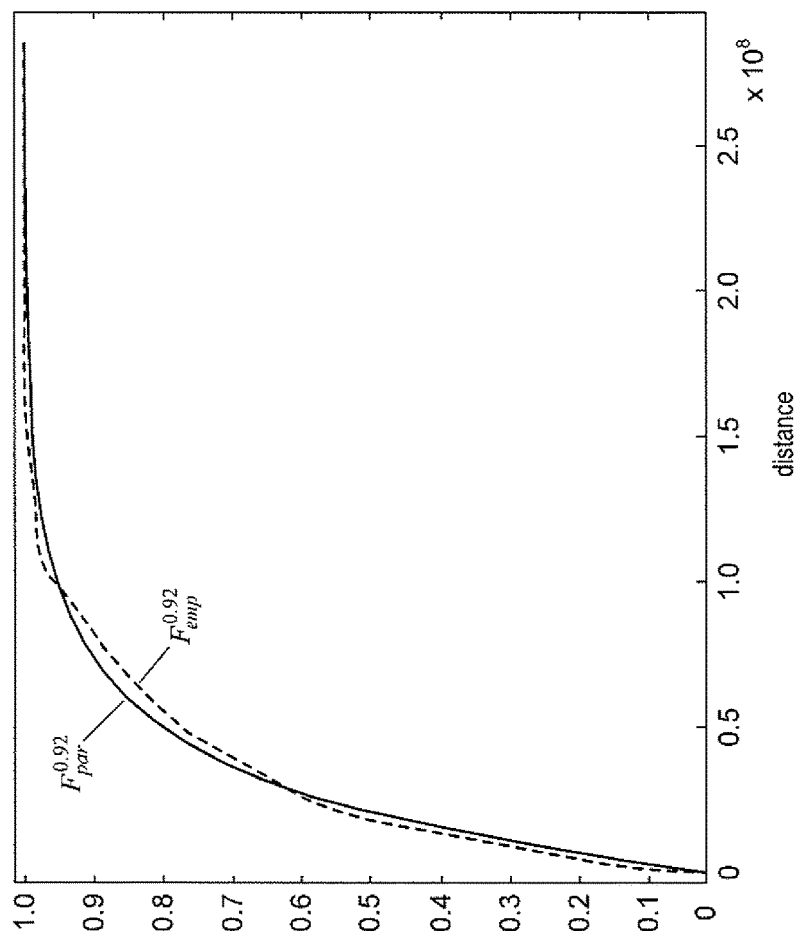
FIG. 18 shows a plot of corresponding empirical and parametric cumulative distributions.
Figure 19:
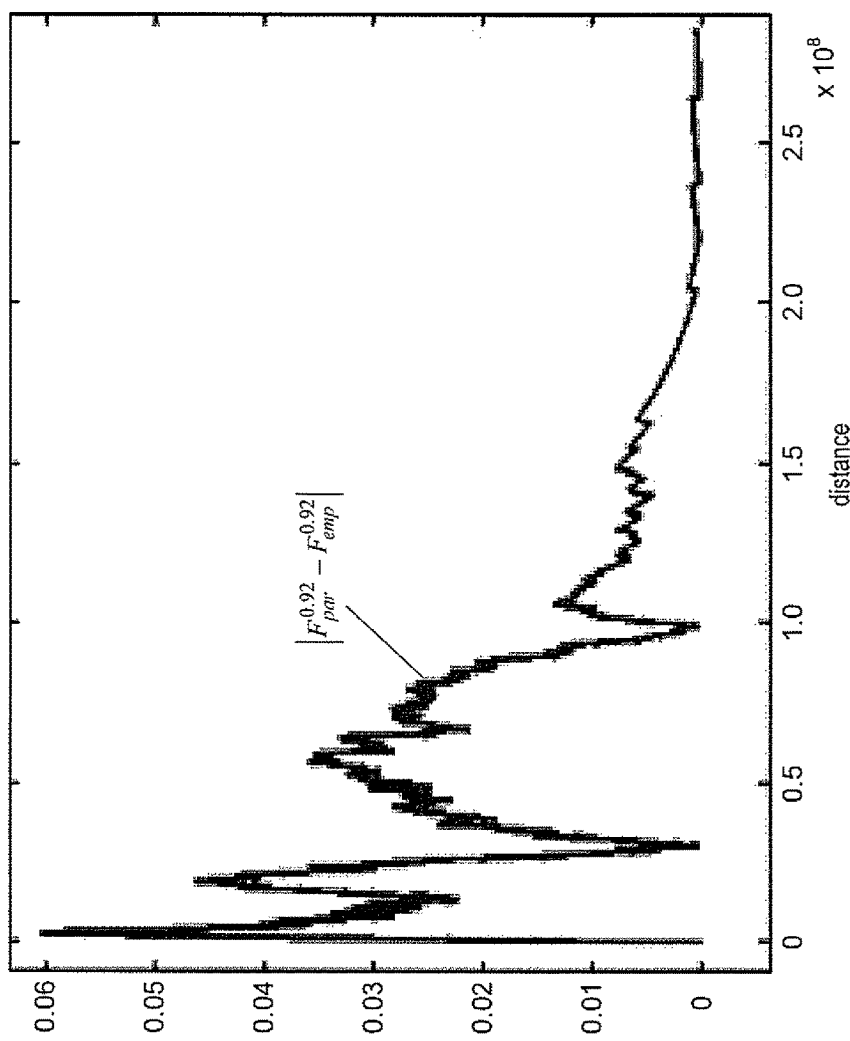
FIG. 19 shows a plot of the absolute error between the empirical and parametric cumulative distributions shown in FIG. 18.
Figure 20:
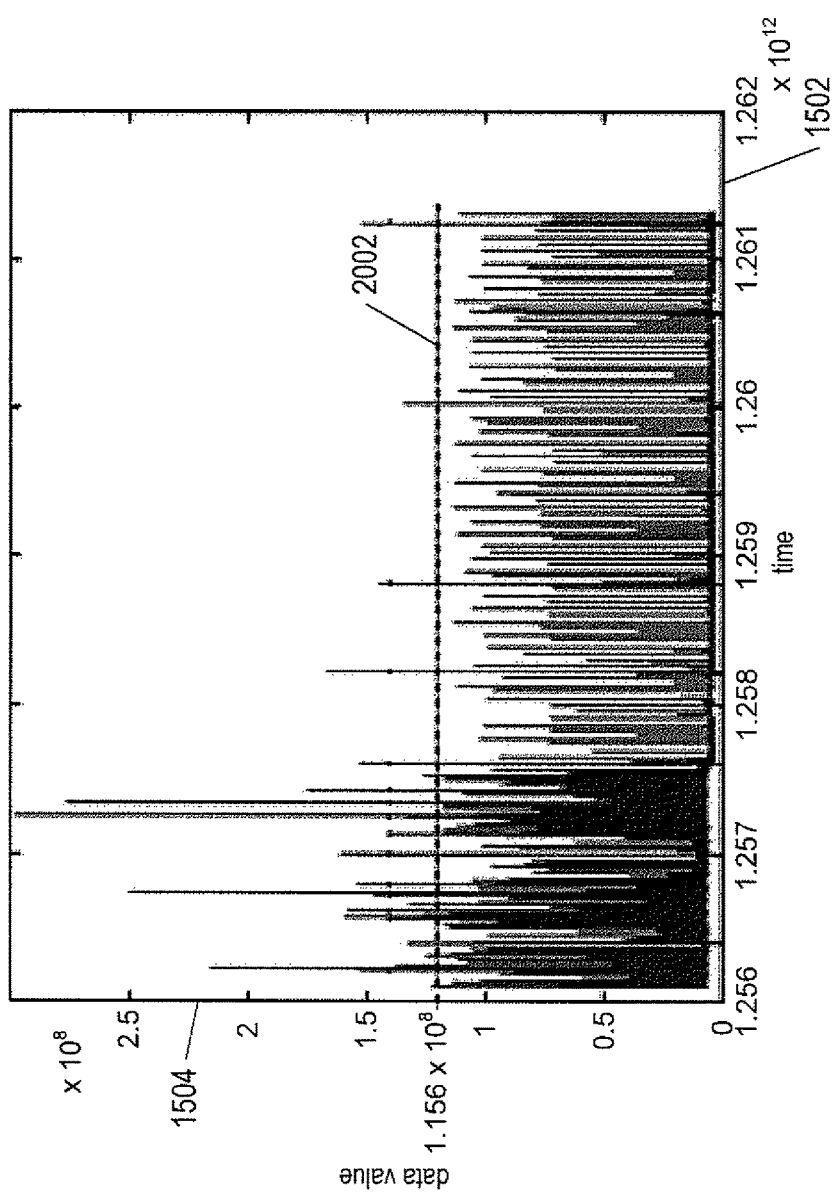
FIG. 20 shows a plot of a hard threshold calculated using parameter implementation for the data shown in FIG. 15

The corresponding results for a parametric implementation are displayed in table shown in FIG. 16 for the parameter implementations using the GP distribution of Equation (16a). Column 1601 displays the quantile index values in hundredths, columns 1602 and 1602 displays values for the parameters γ and σ respectively, and column 1604 displays the relative error calculated according to Equation (19). For relative-error threshold equal to 0.1, only quantile index values in subinterval $0.92 \leq c \leq 0.98$ provide the required goodness-of-fit. The lowest quantile index value in the subinterval $0.92 \leq c \leq 0.98$ is $c=0.92$ 1606 which provides a reasonable quantile to obtain the representative data tail. FIG. 17 shows the data tail $X_{0.92}$ with horizontal axis 1702 representing time and vertical axis 1704 representing distance calculated according to Equation (9). FIG. 18 shows a plot of corresponding empirical and parametric cumulative distribution for $c=0.92$, and FIG. 19 shows a plot of the absolute error between the empirical and parametric cumulative distributions for $c=0.92$. FIG. 20 shows a hard threshold value $1.156 \times 10^8$ represented by dashed line 2002 calculated using an inverse of the parametric GP distribution given by $$T = \frac{\sigma}{\gamma}(1 - (1-\alpha)^\gamma) \quad (23)$$

with a predefined risk confidence level $a=0.97$ and the parameters in the table of FIG. 16 for $e=0.92$.

Figure 21:
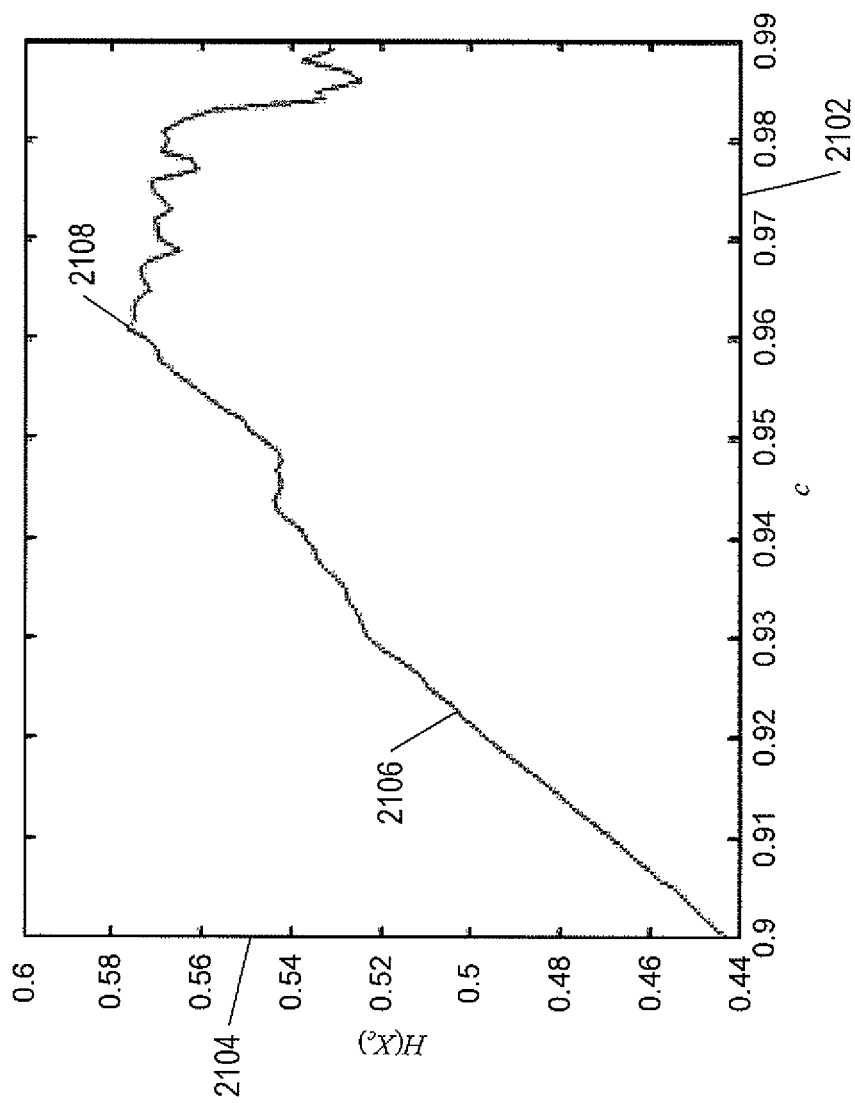
FIG. 21 shows a plot entropy of a non-parametric implementation applied to the set of data shown in FIG. 15.
Figure 22:
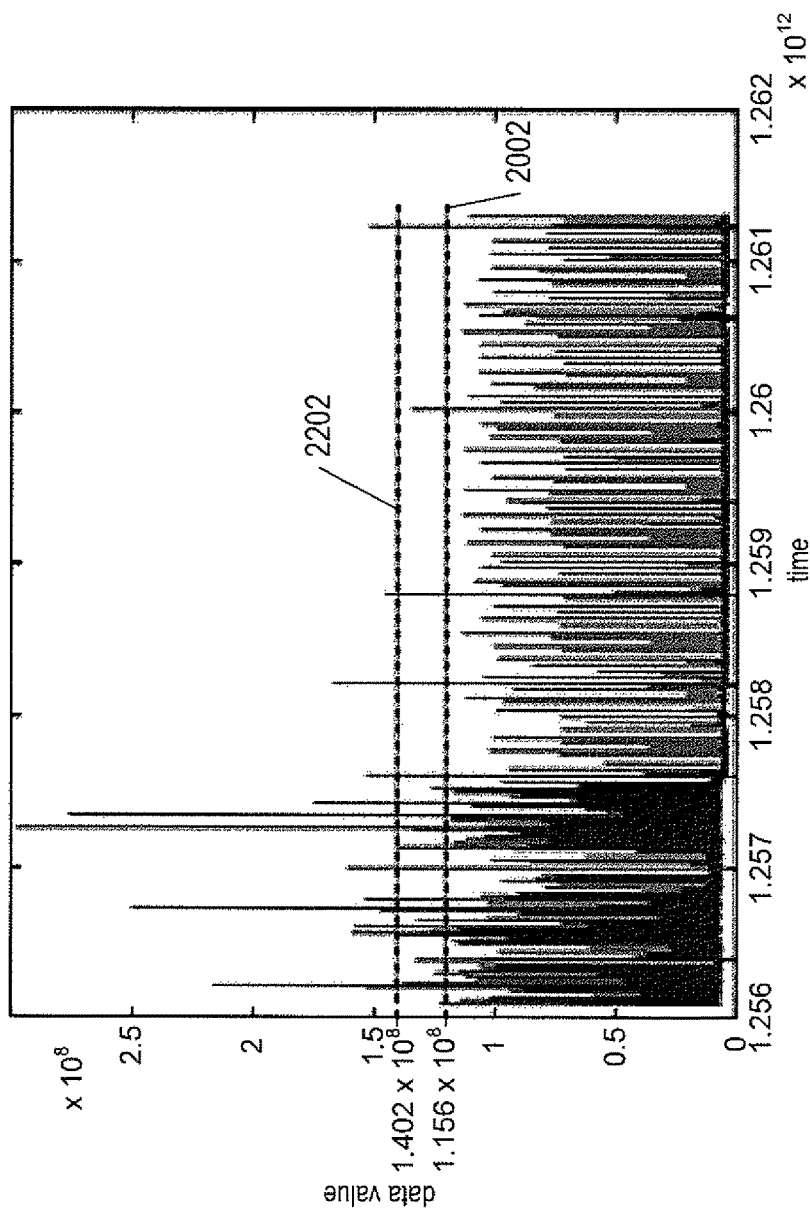
FIG. 22 shows hard threshold values for the parametric and non-parametric implementations applied to the data shown in FIG. 15.

The entropy results for the non-parametric implementation applied to the same set of data shown in FIG. 15 are displayed in FIG. 21. In FIG. 21, horizontal axis 2102 represents the subinterval $0.90 \leq c \leq 0.99$, vertical axis 1604 represents entropy, and curve 2106 represents the entropy calculated using Equation (21). The maximum entropy 2108 corresponds to quantile index $c=0.961$ and quantile $q_c=3.1 \times 10^7$ (which is very close to the base-line derived in the parametric case for the GP fit). Applying the same confidence level $a=0.97$, in this case the hard threshold value is $1.402 \times 10^8$. FIG. 22 shows the threshold value $1.402 \times 10^8$ represented by dashed line 2202 and threshold value $1.156 \times 10^8$ represented by dashed line 2002 for comparison.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method stored in one or more data-storage devices and executed using one or more processors of a computing environment, the method comprising:
   receiving time-series data associated with a data-generating entity over a period of time;
   categorizing the data as trendy data or non-trendy data;
   when the data is identified as trendy data, subtracting a trend from the data to give non-trendy data;
   determining a cumulative distribution that represents probability of data values of the data that violate a quantile of the data by:
      calculating a plurality of quantiles of the data; and
      for at least one of the plurality of quantiles,
         forming a data tail,
         constructing a histogram for the data tail, and
         calculating an empirical cumulative distribution that represents probability of data values in the data belonging to the data tail;
   calculating a hard threshold for the data-generating entity as an inverse of the cumulative distribution based on a user-defined risk confidence level; and
   generating an alert when the time-series data violates the hard threshold for a number of time stamps, the alert indicating a problem with the data-generating entity.

2. The method of claim 1, wherein categorizing the data as trendy or non-trendy data further comprises:
   calculating a trend measure of the data;
   when the trend measure is greater than a trend threshold, categorizing the data as trendy data, otherwise,
   categorizing the data as non-trendy data.

3. The method of claim 1, wherein subtracting the trend from the data further comprises:
   recognizing the trend in the data as one of linear, log-linear, and non-linear using regression analysis;
   decomposing data values in the data into non-trendy components and trendy components; and
   for each data value of the data, subtracting the trendy components based on the trend.

4. The method of claim 1, wherein forming the data tail further comprises:
   for an upper hard threshold,
      calculating a distance from the quantile to data values that are greater than the quantile; and
      collecting the distances to form the data tail.

5. The method of claim 1, wherein forming the data tail further comprises
   for a lower hard threshold,
      calculating a distance from the quantile to data values of the data that are less than the quantile; and
      collecting the distances to form the data tail.

6. The method of claim 1, further comprising:
   for the at least one of the plurality of quantiles,
      calculating a parametric cumulative distribution from the empirical cumulative distribution, and
      calculating a relative error between the parametric cumulative distribution and the empirical cumulative distribution; and
   selecting a parametric cumulative distribution as the cumulative distribution to calculate the hard threshold based on a corresponding relative error being less than a relative-error threshold.

7. The method of claim 1, further comprising:
   for the at least one of the plurality of quantiles,
      calculating an entropy for each histogram, and
      selecting a maximum entropy greater than an entropy threshold; and
   calculating an empirical cumulative distribution as the cumulative distribution used to calculate the hard threshold based on the histogram that corresponds to the maximum entropy.

8. A system for generating a data structure of metric data generated in a computing environment comprising:
   one or more processors;
   one or more data-storage devices; and
   a routine stored in the data-storage devices that when executed using the one or more processors, controls the system to carry out:
      receiving time-series data associated with a data-generating entity over a period time;
      categorizing the data as trendy data or non-trendy data;
      when the data is identified as trendy data, subtracting a trend from the data to give non-trendy data;

determining a cumulative distribution that represents probability of data values of the data that violate a quantile of the data by:
  calculating a plurality of quantiles of the data; and
  for each quantile:
    forming a data tail,
    constructing a histogram for the data tail, and
    calculating an empirical cumulative distribution that represents probability of data values in the data belonging to the data tail;
calculating a hard threshold for the data-generating entity as an inverse of the cumulative distribution based on a user-defined risk confidence level; and
generating an alert when the time-series data violates the hard threshold for a number of time stamps, the alert indicating a problem with the data-generating entity.

9. The system of claim 8, wherein categorizing the data as trendy or non-trendy data further comprises:
  calculating a trend measure of the data;
  when the trend measure is greater than a trend threshold, categorizing the data at as trendy data, otherwise, categorizing the data as non-trendy data.

10. The system of claim 8, wherein subtracting the trend from the data further comprises:
  recognizing the trend in the data as one of linear, log-linear, and non-linear using regression analysis;
  decomposing data values in the data into non-trendy components and trendy components; and
  for each data value of the data, subtracting the trendy components based on the trend.

11. The system of claim 8, wherein forming the data tail further comprises:
  for an upper hard threshold,
    calculating a distance from the quantile to data values that are greater than the quantile; and
    collecting the distances to form the data tail.

12. The system of claim 8, wherein forming the data tail further comprises:
  for a lower hard threshold,
    calculating a distance from the quantile to data values of the data that are less than the quantile; and
    collecting the distances to form the data tail.

13. The system of claim 8, further comprising:
  for each quantile,
    calculating a parametric cumulative distribution from the empirical cumulative distribution, and
    calculating a relative error between the parametric cumulative distribution and the empirical cumulative distribution; and
  selecting a parametric cumulative distribution as the cumulative distribution to calculate the hard threshold based on a corresponding relative error being less than a relative-error threshold.

14. The system of claim 8, further comprising:
  for each quantile,
    calculating an entropy for each histogram, and
    selecting a maximum entropy greater than an entropy threshold; and
  calculating an empirical cumulative distribution as the cumulative distribution used to calculate the hard threshold based on the histogram that corresponds to the maximum entropy.

15. A non-transitory computer-readable medium encoded with machine-readable instructions that implement a method carried out by one or more processors of a computer system to perform the operations of receiving time-series data associated with a data-generating entity over a period of time;
categorizing the data as trendy data or non-trendy data;
when the data is identified as trendy data,
  subtracting a trend from the data to give non-trendy data;
determining a cumulative distribution that represents probability of data values of the data that violate a quantile of the data by:
  calculating a number of quantiles of the data; and
  for each quantile,
    forming a data tail,
    constructing a histogram for the data tail, and
    calculating an empirical cumulative distribution that represents probability of data values in the data belonging to the data tail;
calculating a hard threshold for the data-generating entity as an inverse of the cumulative distribution based on a user-defined risk confidence level; and
generating an alert when the time-series data violates the hard threshold for a number of time stamps, the alert indicating a problem with the data-generating entity.

16. The method of claim 15, wherein categorizing the data as trendy or non-trendy data further comprises:
  calculating a trend measure of the data;
  when the trend measure is greater than a trend threshold, categorizing the data as trendy data, otherwise, categorizing the data as non-trendy data.

17. The method of claim 15, wherein subtracting the trend from the data further comprises:
  recognizing the trend in the data as one of linear, log-linear, and non-linear using regression analysis;
  decomposing data values in the data into non-trendy components and trendy components; and
  for each data value of the data, subtracting the trendy components based on the trend.

18. The method of claim 15, wherein forming the data tail further comprises:
  for an upper hard threshold,
    calculating a distance from the quantile to data values that are greater than the quantile; and
    collecting the distances to form the data tail.

19. The method of claim 15, wherein forming the data tail further comprises
  for a lower hard threshold,
    calculating a distance from the quantile to data values of the data that are less than the quantile; and
    collecting the distances to form the data tail.

20. The method of claim 15, further comprising:
  for each quantile,
    calculating a parametric cumulative distribution from the empirical cumulative distribution, and
    calculating a relative error between the parametric cumulative distribution and the empirical cumulative distribution; and
  selecting a parametric cumulative distribution as the cumulative distribution to calculate the hard threshold based on a corresponding relative error being less than a relative-error threshold.

21. The method of claim 15, further comprises comprising:
  for each quantile,
    calculating an entropy for each histogram, and
    selecting a maximum entropy greater than an entropy threshold; and calculating an empirical cumulative distribution as the cumulative distribution used to calculate the hard threshold based on the histogram that corresponds to the maximum entropy.

* * * * *